(12) United States Patent
Ando et al.

(10) Patent No.: US 6,538,718 B2
(45) Date of Patent: Mar. 25, 2003

(54) PHOTOGRAPHIC FILM CONVEYING DEVICE

(75) Inventors: Shigeru Ando, Kanagawa (JP); Yasuhiro Kaneko, Saitama (JP)

(73) Assignees: Fuji Photo Film Co., Ltd., Kanagawa (JP); Fuji Photo Optical Co., Ltd., Saitama (JP)

( * ) Notice: Subject to any disclaimer, the term of this patent is extended or adjusted under 35 U.S.C. 154(b) by 4 days.

(21) Appl. No.: 09/873,380

(22) Filed: Jun. 5, 2001

(65) Prior Publication Data

US 2001/0048511 A1 Dec. 6, 2001

(30) Foreign Application Priority Data

Jun. 5, 2000 (JP) .......................... 2000-167740
Jun. 5, 2000 (JP) .......................... 2000-167904
Jun. 6, 2000 (JP) .......................... 2000-169595

(51) Int. Cl.[7] .................. G03B 27/48; G03B 27/32; G03B 27/52
(52) U.S. Cl. .................. 355/50; 355/27; 355/40
(58) Field of Search .................. 355/27, 40, 41, 355/55, 50, 72, 75, 407; 348/96, 97, 107, 110; 358/506, 487, 302; 396/612, 620

(56) References Cited

U.S. PATENT DOCUMENTS

| | | | | |
|---|---|---|---|---|
| 5,617,180 A | * | 4/1997 | Yoshikawa | .................. 355/40 |
| 5,721,610 A | * | 2/1998 | Kiten et al. | .................. 355/75 |
| 6,366,366 B1 | * | 4/2002 | Nakamura | .................. 358/487 |

* cited by examiner

Primary Examiner—Henry Hung Nguyen
(74) Attorney, Agent, or Firm—Sughrue Mion, PLLC

(57) ABSTRACT

To achieve for a photographic film conveying device that no external force causing conveying speed to vary is applied to a photographic film during image reading, after a preceding photographic film is discharged from a reading conveying path, the time until a subsequent photographic film is conveyed to the reading conveying path is not long, or even if a photographic film set in a film supplying section is elongate, image reading of photographic films by an image reading section can be carried out efficiently, there is provided a photographic film conveying device comprising a section setting a discharge conveying section in a withdrawn state or a conveying state, a section controlling conveying of preceding and subsequent photographic films, or a section switching a conveying path of a photographic film.

11 Claims, 19 Drawing Sheets

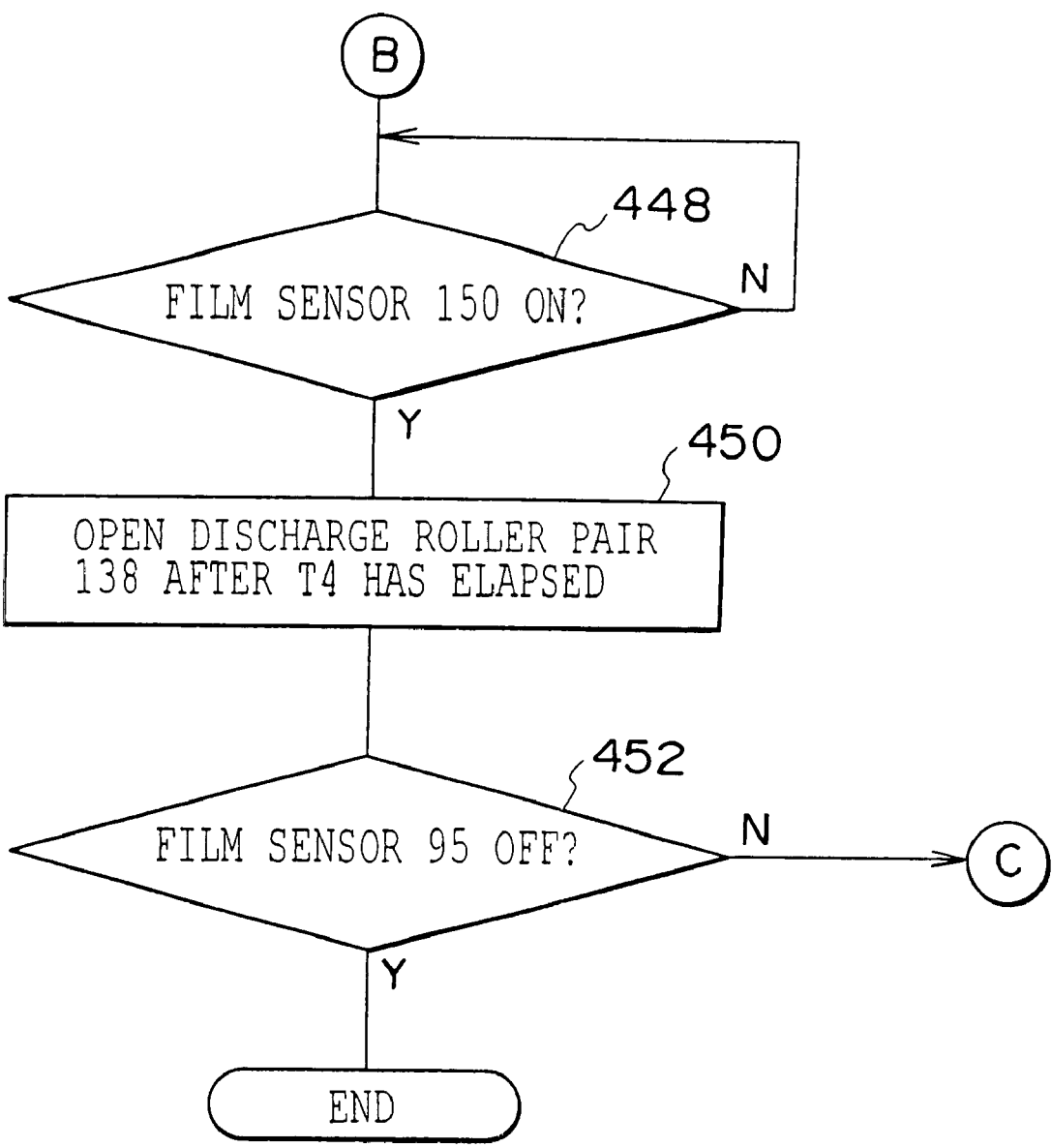

PHOTOGRAPHIC FILM CONVEYING DEVICE

BACKGROUND OF THE INVENTION

1. Field of the Invention

The present invention relates to photographic film conveying device which, while conveying a strip-shaped photographic film on which images are recorded, reads the images of the photographic film by an image reading means such as a scanner or the like.

2. Description of the Related Art

There are digital image processing devices for photographic films which, while conveying a photosensitive material, on which images are recorded, at a predetermined reading speed, read the images of the photographic film by a line scanner which is a CCD line sensor or the like, and use the image data obtained by this reading to record the images onto a recording material or display the images on a display or the like. In such a digital image processing device, for example, prescanning, in which the images of the photographic film are read at a relatively rough resolution by the line scanner, is carried out while the photographic film is conveyed in one direction along a conveying path by conveying roller pairs. After the image sizes and the dynamic ranges and the like of the images recorded on the photographic film have been confirmed, the conveying direction of the photographic film by the conveying roller pairs is reversed. While the photographic film is being conveyed in this opposite direction, fine scanning is carried out in which, on the basis of the data obtained by prescanning, the images of the photographic film are read at a high resolution.

There are digital image processing devices in which a film receiving section, which receives the photographic film after reading (fine scanning) has been completed, is connected to the final end portion of the conveying path of the photographic film. In such a film receiving portion are disposed, for example, a discharge roller pair which is formed of a driving roller and a driven roller, and a roller driving section which transmits torque to the driving roller of the discharge roller pair so as to rotate the driving roller in a predetermined direction. Here, when one end portion of the photographic film is discharged from the final end portion of the conveying path, the driving roller of the discharge roller pair is rotated by the torque from the roller driving section while the photographic film is nipped by a nip portion of the discharge roller pair. In this way, the photographic film is pulled into the film receiving section from the film feed-out path due to the conveying force from the discharge roller pair. When the other end portion of the photographic film separates from the nip portion of the discharge roller pair toward the downstream side thereof, the discharging of the photographic film into the film receiving section is completed.

However, in the above-described digital image processing device, while the photographic film is conveyed at a constant reading speed along the conveying path, fine scanning is carried out in which the images of the photographic film are read by a line scanner at a high resolution. At this time of fine scanning, when the end portion of the photographic film reaches the discharge roller pair of the film receiving section, the conveying speed of the photographic film at the image reading position by the line scanner fluctuates.

Namely, even if the driving roller of the discharge roller pair rotates at a rotating speed which corresponds to the reading speed, a resistance to conveying is applied, even if for an extremely short time, to the photographic film when the photographic film abuts the nip portion of the discharge roller pair. This resistance to conveying is transferred to the conveying roller pair through the photographic film, and causes a change in the rotating speed of the conveying roller pair. Further, after the photographic film is nipped by the nip portion of the discharge roller pair and conveying is started, it is difficult to make the conveying speed of the photographic film by the discharge roller pair exactly match the reading speed. Thus, an increase in tension or slack is generated at the portion of the photographic film between the discharge roller pair and the conveying roller pair. This increase in tension or slack of the photographic film causes a change in load of the conveying roller pair, and a change in the rotational speed is caused.

Such a change in the conveying speed of the photographic film at the reading position is a cause of deterioration in the accuracy of reading the image by the line scanner, and for example, is a cause of defects in image quality such as jitters in the image which is reproduced by the image information obtained by fine scanning.

Moreover, in a case in which the conveying speed of the photographic film by the discharge roller pair is faster than the reading speed which is the speed of conveying the photographic film by the conveying roller pair, when the photographic film is in a state of being conveyed by both the conveying roller pair and the discharge roller pair, the tension at the photographic film increases as time passes, and there is the concern that the photographic film may be damaged by this tension.

Further, there are digital image processing devices in which a film supplying section is connected to one end portion of the reading conveying path. Such a film supplying section is provided with, for example, a film holder in which is set a film bundle in which a plurality of photographic films are stacked together; a feed roller which separates one photographic film from the film bundle set in the film holder, and feeds this photographic film to a film supply path connected to the reading conveying path; and a conveying roller pair which conveys the photographic film along the film supply path to the reading conveying path. In such a digital image processing device, one photographic film is separated, by the feed roller, from the topmost portion or the bottommost portion of the film bundle set in the film holder, and is conveyed to the reading conveying path along the film supply path.

In a conventional digital image processing device such as that described above, after fine scanning of one photographic film is completed and that photographic film is discharged from the reading conveying path, the next photographic film is fed into the film supply path by the feed roller by the film supplying section, and the photographic film is conveyed to the reading conveying path along the film supply path. As a result, a period of time, which corresponds to the path length of the film supply path in the film supplying section and to the film conveying speed, is required from the time after the preceding photographic film has been discharged from the reading conveying path until the time the next photographic film is supplied to the reading conveying path. Accordingly, in a case in which the film supply path is long, the period of time from the time the preceding photographic film is discharged from the reading conveying path to the time when the next photographic film is conveyed to the reading conveying path (i.e., the replacement time) is long. In particular, when the film supplying section is mounted to the main body of the image processing device as an optional unit, in most cases, the length of the film supply path is long due to the requirements imposed by the layout.

Moreover, there are digital image processing devices in which the film supplying section, at which can be set a film bundle in which a plurality of photographic films are stacked, is connected to one end portion of the reading conveying path, and the film receiving section, which receives the photographic film for which reading has been completed, is provided at the other end portion of the reading conveying path. In this digital image processing device, one photographic film is separated from the topmost portion or the bottommost portion of the film bundle by the film bundle by the film supplying section, and this photographic film is automatically supplied to the reading conveying path. In this digital image processing device, prescanning is carried out while the photographic film, which has been supplied from the film supplying section, is conveyed in one direction along the reading conveying path toward the film receiving section. Thereafter, fine scanning is carried out while the photographic film is conveyed in the other (return) direction along the reading conveying path toward the film supplying section.

Accordingly, in a digital image processing device such as that described above in which the film supplying section and the film receiving section are disposed with the reading conveying path therebetween, a subsequent photographic film cannot be supplied to the reading conveying path by an auto film loader unless the fine scanning for the preceding photographic film has been completed and the trailing end of this preceding photographic film whose conveying direction has been reversed reaches a predetermined position along the reading conveying path. As a result, a problem arises in that, the longer the photographic film loaded in the film supplying section, the lower the image reading work efficiency for a plurality of photographic films.

Further, in the above-described digital image processing device, the film supplying section and the film receiving section are disposed such that the reading conveying path is located therebetween. Thus, the dimension along the transverse direction of the device, which is substantially parallel to the conveying direction of the reading conveying path, is long. As a result, much floor space is required for placement of the digital image processing device.

SUMMARY OF THE INVENTION

In view of the aforementioned, an object of the present invention is to provide a photographic film conveying device in which, while a photographic film is being conveyed by a reading conveying means, no external force which causes the conveying speed to vary is applied to the photographic film from a discharging conveying means at the time of image reading in which an image of the photographic film is read by an image reading means.

Another object of the present invention is to provide a photographic film conveying device in which, even if the length of a film supply path is long, after a preceding Nth photographic film is discharged from a reading conveying path, the time until a subsequent (N+1)st photographic film is conveyed to the reading conveying path is not long.

Yet another object of the present invention is to provide a photographic film conveying device in which, even if a photographic film set in a film supplying section is elongate, image reading of a plurality of photographic films by an image reading means can be carried out efficiently, and the amount of floor space required for the device can be reduced.

A first aspect of the present invention is a photographic film conveying device which, while conveying along a film conveying path a strip-shaped photographic film on which images are recorded, reads the images of the photographic film by an image reading section, the photographic film conveying device comprising: a reading conveying section which conveys the photographic film along the film conveying path such that an image recorded region of the photographic film passes through an image reading position at which images are read by the image reading section; a film receiving section which receives the photographic film whose images have been read by the image reading section; a discharge conveying section which conveys the photographic film, whose images have been read by the image reading section, along the film conveying path such that the photographic film is discharged into the film receiving section; and an external disturbance preventing section which, at a time of image reading when the images of the photographic film are read by the image reading section, sets the discharge conveying section in a withdrawn state in which the discharge conveying section is withdrawn from the photographic film which is being conveyed by the reading conveying section, and which, after image reading of the photographic film is completed, sets the discharge conveying section in a conveying state in which conveying of the photographic film is possible.

A second aspect of the present invention is a photographic film conveying device according to the first aspect, wherein the discharge conveying section has a discharge roller pair which, while the photographic film is nipped by a nip portion formed between a pair of rollers, rotates the pair of rollers so as to feed-out the photographic film, and at the time of image reading of the photographic film, the external disturbance preventing section opens the nip portion such that the photographic film can pass between the pair of rollers at the discharge roller pair, and when image reading of the photographic film is completed, the external disturbance preventing section closes the nip portion such that the photographic film which is inserted between the pair of rollers at the discharge roller pair can be conveyed.

A third aspect of the present invention is a photographic film conveying device according to the second aspect, wherein, after image reading of the photographic film is completed, the external disturbance preventing section closes the nip portion at the discharge roller pair synchronously with the photographic film leaving from the reading conveying section.

A fourth aspect of the present invention is a photographic film conveying device according to the second or the third aspect, wherein the film receiving section has a film holder, which can hold a plurality of photographic films which are inserted from an exterior, and a presser mechanism, which presses a photographic film which has left from the nip portion of the discharge roller pair and inserts the photographic film into the film holder.

A fifth aspect of the present invention is a photographic film conveying device which, while conveying a strip-shaped photographic film on which images are recorded, reads the images of the photographic film by an image reading section, the photographic film conveying device comprising: a film supplying section provided with a loading portion into which is loaded a film bundle in which photographic films are stacked, the film supplying section conveying one photographic film from the film bundle loaded in the loading portion to an image input section at which the image reading section is provided; a film supply path for guiding to the image input section the photographic film which is conveyed by the film supplying section; a reading conveying path connected to the film supply path, and guiding the photographic film, which is conveyed to the image input section along the film supply path, to an image reading position at which images are read by the image reading section; a reading conveying section which conveys the photographic film along the reading conveying path such that an image recorded region of the photographic film passes through the image reading position; and a conveying controlling section which, after starting of conveying by the reading conveying section of an Nth photographic film which is an Nth photographic film whose images are read, synchronously with a trailing end of the Nth photographic film passing through a connection section of the film supply path and the reading conveying path, starts conveying, from the loading portion and by the film supplying section, of an (N+1)st photographic film which is an (N+1) st photographic film whose images are read, and holds the (N+1)st photographic film in the film supply path until the Nth photographic film is discharged.

A sixth aspect of the present invention is a photographic film conveying device according to the fifth aspect, wherein a leading end detecting sensor is provided on the film supply path, and the leading end detecting sensor detects a leading end of the photographic film conveyed by the film supplying section, and outputs a detection signal, and, synchronously with outputting of the detection signal from the leading end detecting sensor, the conveying controlling section stops conveying of the (N+1)st photographic film by the film supplying section, and when the Nth photographic film is discharged from the reading conveying path, restarts conveying of the (N+1)st photographic film by the film supplying section.

A seventh aspect of the present invention is a photographic film conveying device according to the fifth or sixth aspect, further comprising: a film receiving section which receives the photographic film after image reading; a film feed-out path which merges with the film supply path and which guides to the film receiving section the photographic film which has been discharged from the image input section through the reading conveying path; and a conveying switching section which switches a conveying path of the photographic film such that, when the photographic film is conveyed by the film supplying section, the photographic film enters into the reading conveying path from the film supply path, and when a trailing end of the photographic film passes through a merging section with the film feed-out path in the film supply path, the photographic film enters into the film feed-out path from the reading conveying path.

A eighth aspect of the present invention is a photographic film conveying device which, while conveying a strip-shaped photographic film on which images are recorded, reads the images of the photographic film by an image reading section, the photographic film conveying device comprising: an auto film loader including a film supplying section in which is loaded a film bundle in which photographic films before image reading are stacked, and which conveys one photographic film from the film bundle into an image input section at which the image reading section is provided, and a film receiving section which receives photographic films after image reading; a film supply path for guiding to the image input section the photographic film conveyed by the film supplying section; a reading conveying path which is connected to the film supply path and which guides, to an image reading position at which images are read by the image reading section, the photographic film which is conveyed through the film supply path to the image input section; a reading conveying section which conveys the photographic film along the reading conveying path such that an image recorded region of the photographic film passes through the image reading position; a film feed-out path which merges with the film supply path and which guides to the film receiving section the photographic film which is discharged from the image input section through the reading conveying path; and a conveying switching section which switches a conveying path of the photographic film such that, when the photographic film is conveyed by the film supplying section, a leading end of the photographic film enters into the reading conveying path from the film supply path, and when a trailing end of the photographic film passes through a merging section with the film feed-out path in the film supply path, the photographic film enters into the film feed-out path from the reading conveying path.

A ninth aspect of the present invention is a photographic film conveying device according to the eighth aspect, wherein the conveying switching section has a gate member which can move between a first guide position, at which the gate member guides the photographic film from the reading conveying path to the film feed-out path, and a second guide position, at which the gate member guides the photographic film from the film supply path to the reading conveying path, and the gate member is urged to the first guide position, and the gate member moves from the first guide position to the second guide position due to pushing force from a photographic film which has reached the merging section at the time the photographic film is being conveyed by the film supplying section, and after a trailing end of the photographic film has passed through the merging section, the gate member returns to the first guide position.

A tenth aspect of the present invention is a photographic film conveying device according to the eighth or ninth aspect, further comprising a loop forming section which, at the time when the photographic film is being conveyed by both the film supplying section and the reading conveying section, forms a loop portion, which bends in a direction of thickness of the photographic film, in the photographic film at the film supply path, and the loop forming section can feed a portion of the loop portion out toward the reading conveying path.

A eleventh aspect of the present invention is a photographic film conveying device according to the eighth, ninth or tenth aspect, wherein a discharge conveying section, which conveys the photographic film, which has entered into the film feed-out path, such that the photographic film is discharged from the film feed-out path, and a film holding section, which can hold ones of end portions of a plurality of photographic films which have been successively discharged from the film feed-out path by a discharge mechanism, are provided in the film receiving section.

In accordance with a photographic film conveying device of a first aspect of the present invention, at a time of image reading when the images of the photographic film are read by the image reading section, the external disturbance preventing section sets the discharge conveying section in a withdrawn state where the discharge conveying section is withdrawn from the photographic film which is being conveyed by the reading conveying section. After image reading of the photographic film is completed, the external disturbance preventing section sets the discharge conveying section in a conveying state where conveying of the photographic film is possible. In this way, at the time of image reading of the photographic film, no external force, such as resistance to conveying, impact force, tensile force, or the like is applied to the photographic film from the discharge conveying section. Thus, the conveying speed of the photographic film by the reading conveying section can be prevented from varying due to an external force from the discharge conveying section. As a result, the accuracy of reading the film images by the image reading section can be prevented from be deteriorated due to variations in the conveying speed of the photographic film. Thus, a deterioration in image quality of the images reproduced by the image information from the image reading section can be prevented.

After image reading of the photographic film by the reading section has been completed, the photographic film can be conveyed by the discharge conveying section. Thus, the photographic film after image reading can be discharged to the film receiving section from the film conveying path.

In accordance with the photographic film conveying device of a second aspect of the present invention, at the time of image reading of the photographic film, the external disturbance preventing section opens the nip portion such that the photographic film can pass between the pair of rollers at the discharge roller pair, and when image reading of the photographic film is completed, the external disturbance preventing section closes the nip portion such that the photographic film which is inserted between the pair of rollers at the discharge roller pair can be conveyed. In this way, at the time of image reading of the photographic film, even if an end portion of the photographic film reaches the discharge roller pair, the nip portion of the pair of rollers forming the discharge roller pair is open. Thus, the photographic film can pass smoothly between the pair of rollers, and external force which can vary the conveying speed is prevented from being applied to the photographic film from the discharge roller pair. At this time, one of the rollers of the roller pair may be a guide member which, while sliding toward one surface of the photographic film, guides the photographic film to a predetermined position of the film receiving section. Further, the pair of rollers may be withdrawn to positions at which the rollers do not contact the photographic film, such that no frictional resistance is applied to the photographic film from the discharge roller pair.

After image reading of the photographic film has been completed, the nip portion of the discharge roller pair is closed, and conveying of the photographic film inserted between the pair of rollers is possible. Thus, the photographic film can be discharged into the film receiving section by the discharge roller pair. At this time, if image reading of the photographic film has been completed, the closing of the nip portion may be carried out before the photographic film is inserted between the pair of rollers. However, in this case, the photographic film must be conveyed by the reading conveying section up to the point where the photographic film is inserted into the nip portion of the discharge roller pair.

In accordance with the photographic film conveying device of a fifth aspect of the present invention, after starting of conveying by the reading conveying section of an Nth photographic film which is the Nth photographic film whose images are read, synchronously with a trailing end of the Nth photographic film passing through a connection section of the film supply path and the reading conveying path, a conveying controlling section starts conveying, from the loading section and by the film supplying section, of an (N+1)st photographic film which is the (N+1)st photographic film whose images are read, and holds the (N+1)st photographic film in the film supply path until the Nth photographic film is discharged from the connection section to a film feed-out path. In this way, at the time of image reading in which the images of the Nth photographic film are read by the image reading section while the Nth photographic film is conveyed along the reading conveying path by the reading conveying section, conveying of the (N+1)st photographic film by the film supplying section from the loading section is already started. It is possible for the leading end of the (N+1)st photographic film to be conveyed along the film supply path to before the connection section with the reading conveying path. Thus, the time, from after the preceding Nth photographic film has been discharged from the reading conveying path, to the time when the subsequent (N+1)st photographic film is conveyed into the reading conveying path from the film supply path, can be shortened.

At this time, even in a case in which the length of the film supply path is long, the reading time needed to read one photographic film by the image reading section is usually longer than the conveying time for conveying the photographic film from the loading section to the reading conveying path along the film supply path. Thus, while the images of the Nth photographic film are being read, the (N+1)st photographic film can be conveyed along the film supply path until the leading end of the (N+1)st photographic film is just before the reading conveying path. Thus, without affecting the path length of the film supply path, the time, from the time the Nth photographic film is discharged from the reading conveying path to the time the (N+1)st photographic film is conveyed from the film supply path to the reading conveying path, can always be made constant and sufficiently short.

In the photographic film conveying device of the sixth aspect of the present invention, a leading end detecting sensor, which detects a leading end of the photographic film, is provided on the film supply path. Synchronously with the outputting of a detection signal from the leading end detecting sensor, the conveying controlling section stops conveying of the (N+1)st photographic film by the film supplying section. When the Nth photographic film is discharged from the reading conveying path, the conveying control section restarts conveying of the (N+1)st photographic film by the film supplying section. Thus, while the images of the Nth photographic film are being read, the (N+1)st photographic film can be accurately conveyed until the leading end thereof is at a predetermined standby position at the film supply path. Therefore, the width of variations (errors) in the period of time from the time after the Nth photographic film is discharged from the reading conveying path to the time the (N+1)st photographic film is conveyed from the film supply path to the reading conveying path, can be made sufficiently small.

A photographic film conveying device of the seventh aspect of the present invention further includes: a film receiving section which receives the photographic film after image reading; a film feed-out path which merges with the film supply path and which guides to the film receiving section the photographic film which has been discharged from the image input section through the reading conveying path; and a conveying switching section which switches a conveying path of the photographic film such that, when the photographic film is conveyed by the film supplying section, the photographic film enters into the reading conveying path from the film supply path, and when a trailing end of the photographic film passes through a merging section with the film feed-out path in the film supply path, the photographic film enters into the film feed-out path from the reading conveying path. In this case, the (N+1)st photographic film cannot be fed into the reading conveying path with a fixed interval between the (N+1)st photographic film and the trailing end of the Nth photographic film.

Thus, at the photographic film conveying device having the above-described structure, at the time of image reading when the images of the Nth photographic film are being read, conveying the (N+1)st photographic film by the film supplying section until before the connection section with the reading conveying path, is particularly effective in order to shorten the conveying time of the (N+1)st photographic film from the film supply path to the reading conveying path.

In accordance with the photographic film conveying device of the eighth aspect of the present invention, the conveying switching section switches a conveying path of the photographic film such that, when the photographic film is conveyed by the film supplying section, a leading end of the photographic film enters into the reading conveying path from the film supply path, and when a trailing end of the photographic film passes through a merging section with the film feed-out path in the film supply path, the photographic film enters into the film feed-out path from the reading conveying path. In this way, when the leading end of the photographic film, which is being conveyed along the film supply path by the film supplying section, reaches the reading conveying path, the photographic film enters into the reading conveying path from the film supply path, and is conveyed along the reading conveying path so as to pass through the reading position. Further, after the trailing end of this photographic film passes through the merging section, when the conveying direction of the photographic film is reversed and the trailing end reaches the merging section, the photographic film enters into the film feed-out path, and is fed-out along the film feed-out path to the film receiving section.

Accordingly, if prescanning of the photographic film is carried out by the image reading section while the photographic film is being conveyed in one direction from the merging section toward the reading position and fine scanning of the photographic film is carried out while the photographic film is being conveyed in the other (return) direction from the reading position toward the merging section, even if the photographic film is elongate, the trailing end side of the photographic film can be fed-out along the film feed-out path into the film receiving section while the photographic film is being fine scanned while being conveyed in the other (return) direction. Thus, after fine scanning is completed, simultaneously with the leading end of the photographic film passing through the merging section, supply of the next photographic film by the film supplying section into the reading conveying path is possible.

As a result, as compared with a conventional device in which, after fine scanning of the photographic film is completed, the conveying direction of the photographic film is reversed and the photographic film is fed-out into a film receiving section provided at the opposite side of the film supplying section, the period of time from the time fine scanning is completed to the time when supply of the next photographic film into the reading conveying path is possible (i.e., the feed-out wait time) can be shortened. Further, even if the photographic film is elongate, the feed-out wait time does not increase. Thus, the reading time when images of a plurality of photographic films are continuously read by the image reading section can be shortened.

Further, in the photographic film conveying device of the present invention, both the film supplying section, in which the photographic films before image reading are loaded, and the film receiving section, in which the photographic films after image reading are received, are disposed in the auto film loader. Thus, as compared with a device in which the film supplying section and the film receiving section are disposed on opposite sides of the reading conveying path, the dimension along the transverse direction of the device, which is substantially parallel to the conveying direction of the reading conveying path, can be shortened. Thus, the floor space which is necessary to place the device can be decreased.

BRIEF DESCRIPTION OF THE DRAWINGS

FIG. 19 is a control flowchart showing photographic film conveying control in the image input device relating to the third embodiment of the present invention.

DETAILED DESCRIPTION OF THE PREFERRED EMBODIMENTS

An image input device relating to a first embodiment of the present invention will be described hereinafter on the basis of the drawings.

Structure of the Embodiment

Figure 1:
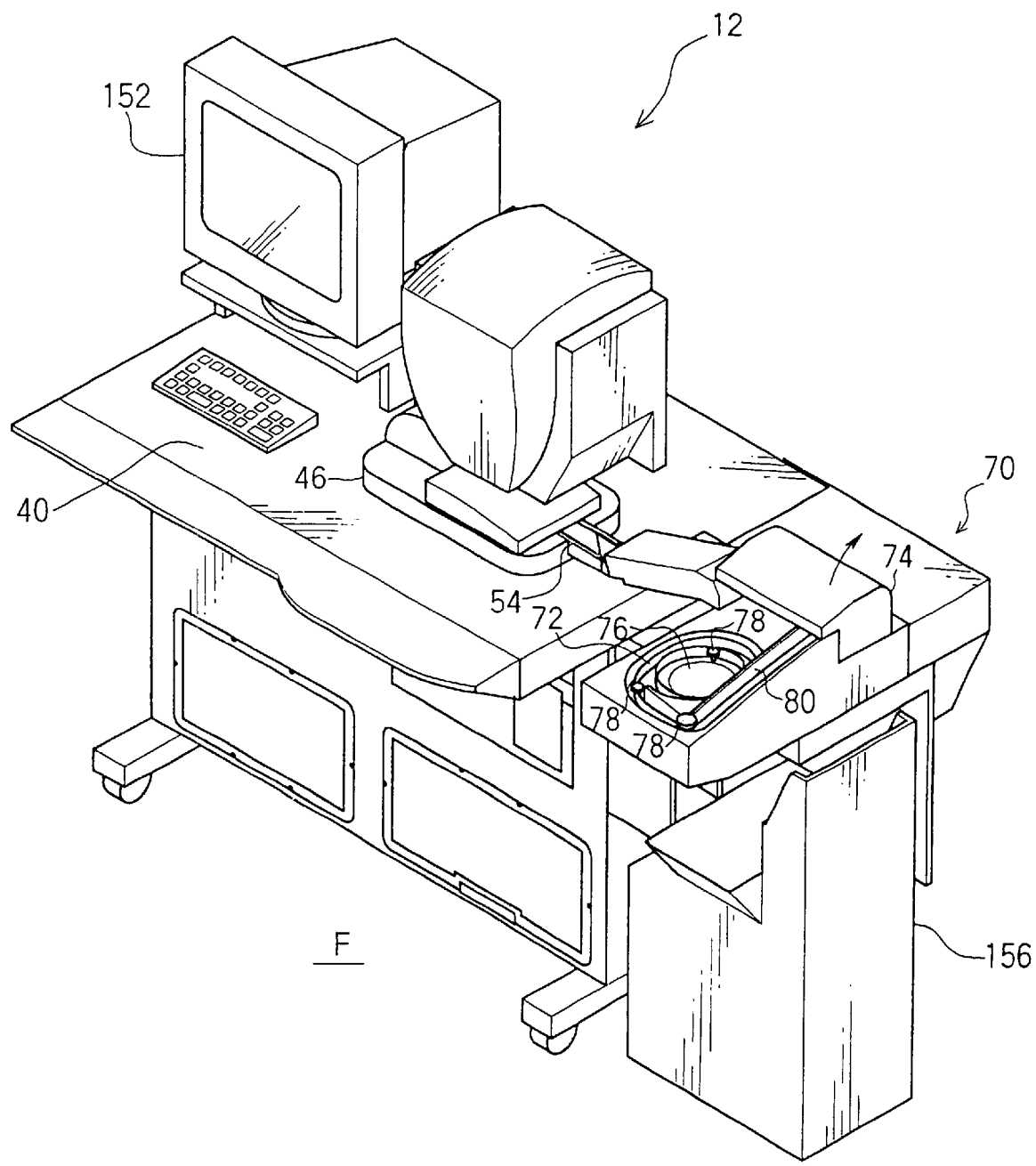
FIG. 1 is a perspective view showing an exterior of an image input device relating to embodiments of the present invention.
Figure 2:
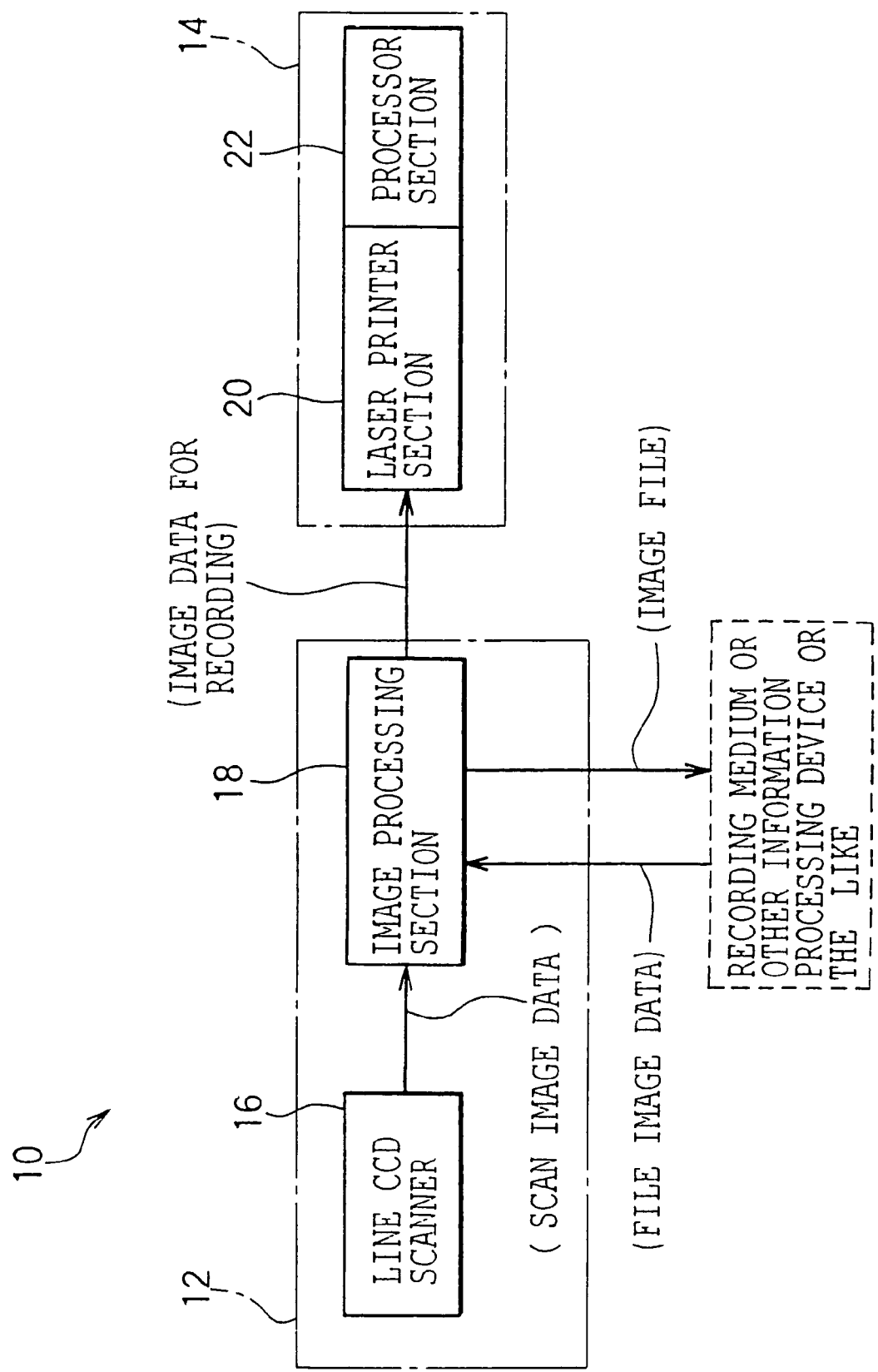
FIG. 2 is a block diagram showing a schematic structure of a digital lab system using the image input device relating to the embodiments of the present invention.

FIG. 1 illustrates the exterior of an image input device relating to the embodiments of the present invention. FIG. 2 is a block diagram showing the schematic structure of a digital lab system using the image input device relating to the embodiments of the present invention. As shown in FIG. 2, a digital lab system 10 is provided with an image input device 12 and an image output device 14. The image input device 12 is provided with a line CCD scanner 16 and an image processing section 18. The image output device 14 is provided with a laser printer section 20 and a processor section 22.

The line CCD scanner 16 is for reading film images recorded on a photographic film such as a negative film or a reversal film or the like. The line CCD scanner 16 has a line CCD 24 (see FIG. 5) in which are aligned three rows of sensors for R (red), G (green) and B (blue) photometry. An image of a photographic film 26 is read by the line CCD 24, and the image data of the three colors of R, G, B is outputted to the image processing section 18.

The image processing section 18 carries out image processings such as correction and the like on the image data from the line CCD 24, and outputs the image processed data to the laser printer section 20 as image data for recording. Further, the image processing section 18 can output the image data which was subjected to the image processings to the exterior as an image file. (For example, the image processing section 18 can output the image processed data to a storage medium such as a memory card or to an external storage device such as an HDD, or can transmit the image processed data to another information processing device via a communication line, or the like.)

The laser printer section 20 is provided with laser light sources which emit R, G, B laser lights. The laser light, which is modulated in accordance with the image data for recording inputted from the image processing section 18, is illuminated onto a photographic printing paper, and an image (latent image) is formed on the photographic printing paper by scan exposure. Further, the processor section 22 carries out the respective processings of color developing, bleaching fixing, rinsing, and drying on the photographic printing paper which has been scan exposed by the laser printer section 20. In this way, the latent image formed on the photographic printing paper is developed such that a visible image is formed.

Figure 5:
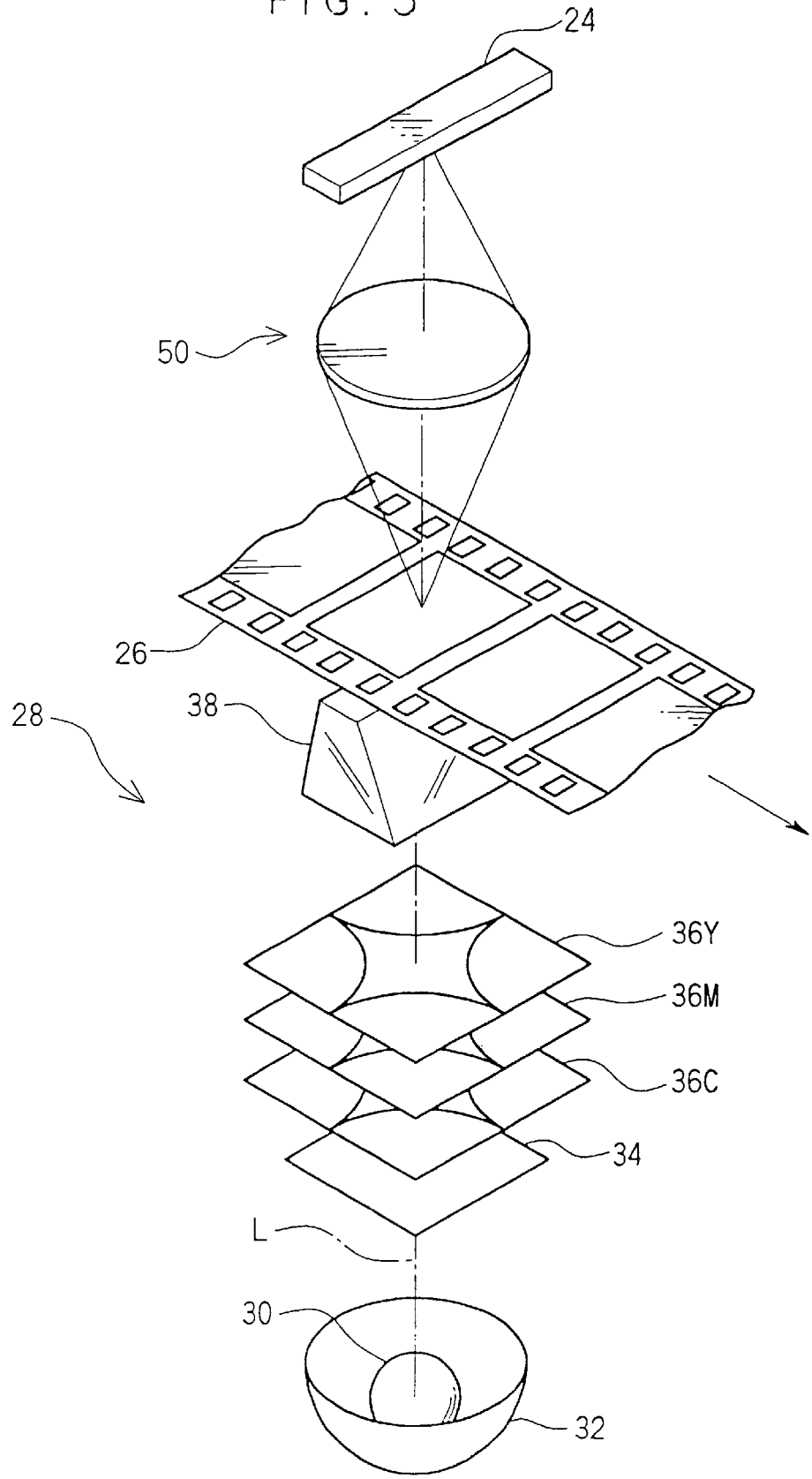
FIG. 5 is a perspective view showing the structure of a reading optical system in the image input device relating to the embodiments of the present invention.

FIG. 5 illustrates a reading optical system 28 included in the line CCD 24 provided in the image input device 12. The reading optical system 28 is provided with a light source 30 formed from a metal halide lamp or a halogen lamp or the like. A parabolic reflector 32, through which IR (infrared) light selectively passes, is disposed such that the light source 30 is positioned at the focal point position. The light emitted from the light source 30 is reflected by the reflector 32 and is illuminated in the direction of the photographic film 26.

An IR cutting filter 34 which cuts the infrared rays of the light emitted from the light source 30, filters 36C 36Y, 36M for C (cyan), M (magenta), and Y (yellow), and a light diffusion box 38 which makes the light illuminated to the photographic film 26 into diffused light, are disposed in that order from the light source 30 side on an optical axis L in the reading optical system 28 as shown in FIG. 5. The IR cutting filters 34, 36C, 36M, 36Y are formed so as to be movable independently of one another. The amounts of insertion of the IR cutting filters 34, 36C, 36M, 36Y onto the optical path is adjusted in consideration of the balance of the light amounts of the respective component color lights emitted from the light source 30, the sensitivities with respect to the respective component color lights at the line CCD 24, and the like. In this way, the balance of the amounts of R, G, B color lights received at the line CCD 24 can be adjusted.

Figure 3:
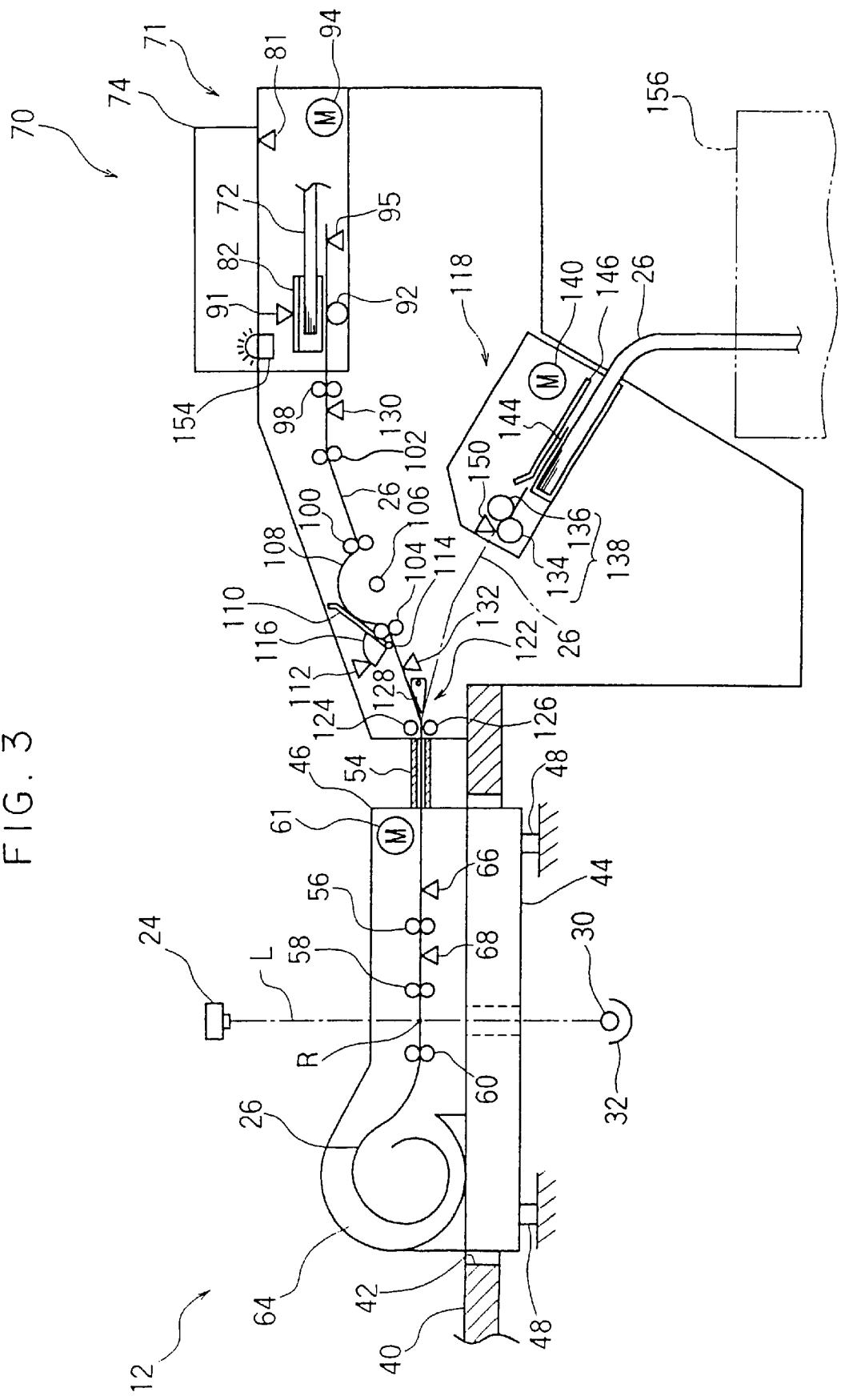
FIG. 3 is a side view showing the structure of a film carrier and an AFL unit in the image input device relating to the embodiments of the present invention.

As shown in FIG. 1, a planar work table 40 is provided at the image input device 12 so as to be substantially parallel to a floor F. As shown in FIG. 3, an opening 42, which passes through in the thickness direction of the work table 40, is formed in the work table 40. A vibration isolating stand 44 which is mounted to a frame of the device is disposed in the opening 42. The vibration isolating stand 44 is supported such that the top surface portion thereof is flush with the top surface of the work table 40. A housing-shaped film carrier 46 is removably mounted to the top surface portion of the vibration isolating stand 44.

The vibration isolating stand 44 is mounted to the device frame via an elastic member 48 formed from a vibration isolating rubber or the like. Vibrations from a source of vibration, such as the exterior of the device or a motor within the device or the like, are blocked by the elastic member 48. The vibration isolating stand 44, together with the film carrier 46, integrally support the reading optical system 28. In this way, even if vibrations are transmitted to the frame at the time of reading an image of the photographic film 26, the film carrier 46 and the reading optical system 28 are respectively maintained in stationary states, such that a deterioration in the accuracy of reading the photographic film 26 due to vibrations is prevented.

As shown in FIG. 5, a lens unit 50, which focuses the light which has passed through the photographic film 26, is disposed at the side of the film carrier 46 opposite the side at which the light source 30 is provided. The line CCD 24 is disposed at the focusing position of the lens unit 50. Note that in FIG. 5, the lens unit 50 is illustrated as a single lens. However, the lens unit 50 may be a single focusing lens or may be a zoom lens formed from plural lenses.

The line CCD 24 is formed by a three-line color CCD in which three CCD cell rows are provided. The CCD cell row is formed by CCD cells being arranged in a line orthogonal to the conveying direction of the photographic film 26 by the film carrier 46. A color separating filter of R, G, or B is mounted to the light-incident side of each of the three CCD cell rows. Accordingly, main scanning of the film reading is carried out along the direction in which the CCD cells are aligned, and subscanning of the film image reading is carried out by the photographic film 26 being conveyed by the film carrier 46.

At the line CCD 24, the three lines (CCD cell rows) are disposed so as to be separated by predetermined intervals along the conveying direction of the photographic film 26 in the film carrier 46 (i.e., along the subscanning direction). Thus, there is a time lag in the detection times of the respective component colors of R, G, B of the same pixel. However, in the present embodiment, the output times of the photometric signals are delayed by different time lags for each of the component colors so that the R, G, B photometric signals of the same pixel are outputted simultaneously from the line CCD scanner 16.

Figure 4:
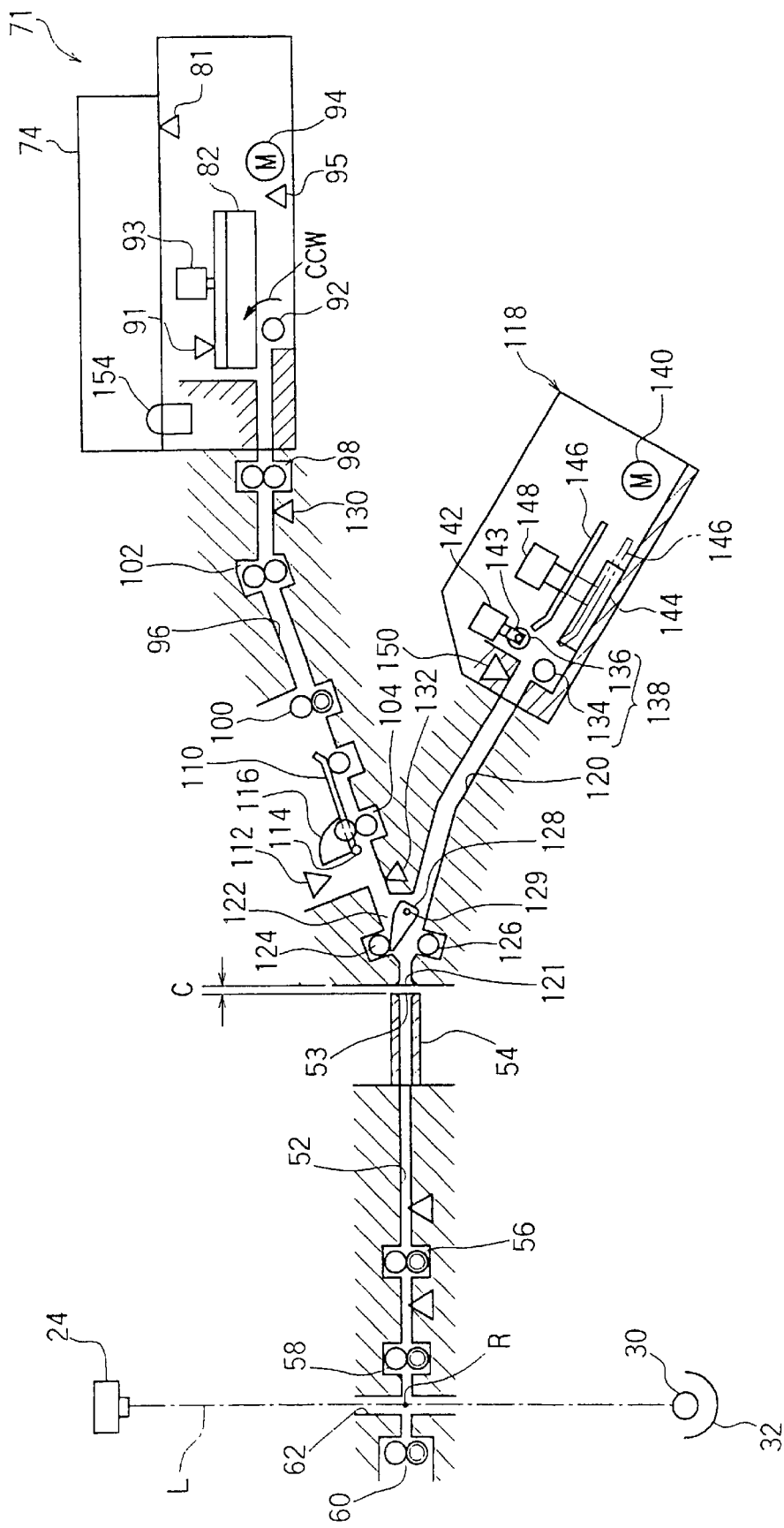
FIG. 4 is a side sectional view showing the structure along a photographic film conveying path in the image input device relating to the embodiments of the present invention.

As shown in FIG. 4, a reading conveying path 52, which is for guiding the photographic film 26 to a predetermined reading position R, is provided at the film carrier 46. The reading conveying path 52 extends to the interior of the film carrier 46 from a distal end surface of a supply guiding portion 54 which projects sideways from a side plate portion of the film carrier 46. A film supply opening 53 for supplying the photographic film 26 to the reading conveying path 52 is formed in the distal end surface of the supply guiding portion 54.

As shown in FIG. 4, a first conveying roller pair 56, a second conveying roller pair 58 and a third conveying roller pair 60 are disposed in order in the film carrier 46 along the reading conveying path 52 from the film supply opening 53 side. Each of the conveying roller pairs 56, 58, 60 is formed by a driven roller and a driving roller. Torque from a common conveying motor 61 (see FIG. 3) is transmitted to the respective driving rollers of the conveying roller pairs 56, 58, 60. Here, the conveying motor 61 is formed by a step motor which can control the rotational speeds and the directions of rotation of the respective conveying roller pairs 56, 58, 60.

When the photographic film 26 is supplied into the film carrier 46 from the film supply opening 53, the conveying roller pairs 56, 58, 60 convey the photographic film 26 along the reading conveying path 52 in one direction (the sub-scanning direction) which is orthogonal to the optical axis L. A slit hole 62 which is elongated in the transverse direction of the photographic film 26 is formed in the film carrier 46 along the optical axis L as shown in FIG. 4. In this way, the light emitted from the light source 30 passes through the photographic film 26 and is incident on the lens unit 50 above the film carrier 46. Here, the position at which the optical axis L of the reading optical system 28 and the photographic film 26 within the film carrier 46 intersect one another is the reading position R.

As shown in FIG. 3, a film wind-up section 64, which is substantially cylindrical, is formed integrally with the film carrier 46 at the end portion thereof opposite the end portion at which the film supply opening 53 is formed. The other end portion of the reading conveying path 52 is connected to the film wind-up section 64. The inner wall portion of the film wind-up section 64 is a guide surface for making the photographic film 26 bend in accordance with the natural curl thereof. In this way, the photographic film 26, which is conveyed into the film wind-up section 64 from the reading conveying path 52 by the third conveying roller pair 60, is wound up in a roll form and accommodated in the film wind-up section 64.

As shown in FIG. 3, within the film carrier 46 and along the reading conveying path 52, a first film sensor 66 in the film carrier 46 is provided between the film supply opening 53 and the first conveying roller pair 56, and a second film sensor 68 in the film carrier 46 is provided between the first conveying roller pair 56 and the second conveying roller pair 58. These film sensors 66 in the film carrier 46, 68 in the film carrier 46 each have a light projecting portion and a light receiving portion which oppose one another across the reading conveying path 52. When the light emitted from the light projecting portion is blocked by the photographic film 26, the light receiving section outputs a detection signal synchronously therewith.

As shown in FIG. 1, at the image input device 12, an auto film loader unit (hereinafter, "AFL unit") 70 is attached, as an optional unit, to the side (the right side in FIG. 1) of the work table 40. A film supplying section 71 (see FIG. 3) is provided at the top surface portion of the AFL unit 70. A film bundle 72, which is formed by photographic films 26 which have not yet been subjected to image reading being stacked in the direction of thickness thereof, is set in the film supplying section 71. A film holder cover 74, which is provided at the top surface portion of the AFL unit 70, and a film accommodating chamber 76, which is a circular recess which opens toward the top surface portion of the AFL unit 70, are provided at the film supplying section 71. The film accommodating chamber 76 is of a depth which corresponds to the width of the photographic film 26. A plurality of guide pins 78 are disposed erect at the peripheral portion of the bottom surface of the film accommodating chamber 76 along the peripheral direction thereof at substantially even intervals.

One end of an elongated, groove-shaped film guide path 80 is connected to the outer peripheral surface of the film accommodating chamber 76. The film guide path 80 extends to the interior of the film holder cover 74 which is disposed behind the film accommodating chamber 76 as viewed by the operator. The film holder cover 74 is disposed at the top surface portion of the AFL unit 70 so as to be able to be opened and closed. As shown in FIG. 3, a cover sensor 81 is provided at the film supplying section 71. The cover sensor 81 detects the film holder cover which is at the closed position and outputs a detection signal.

Figure 6:
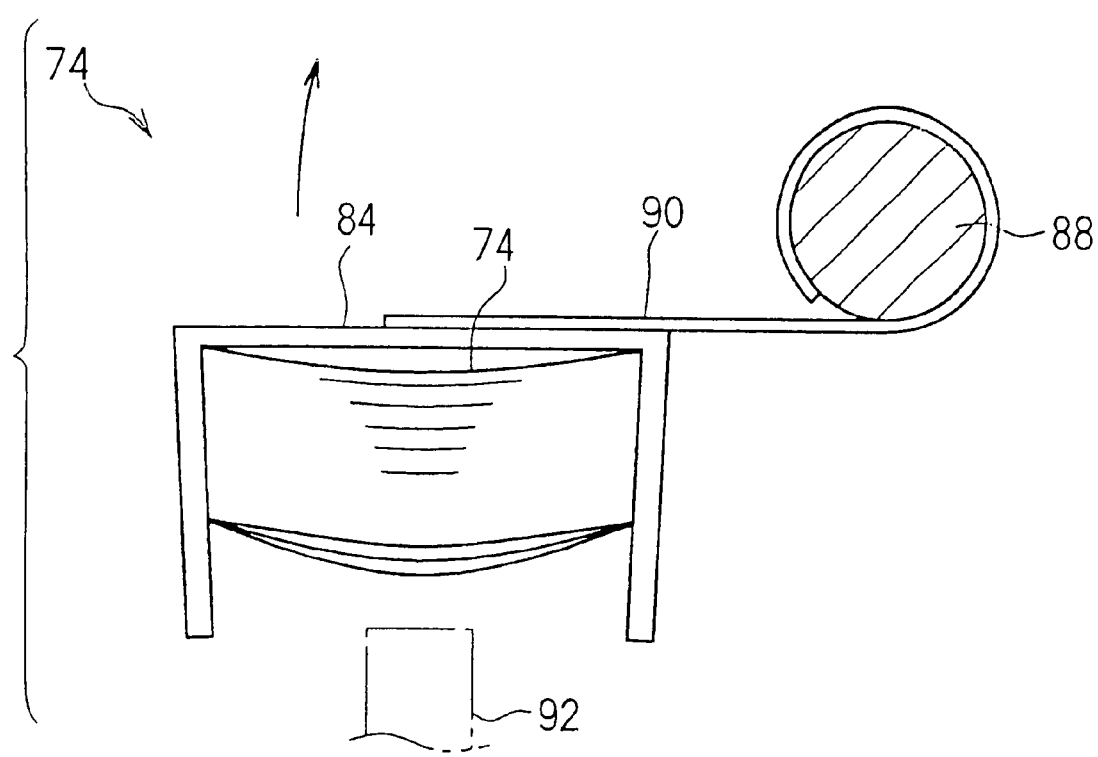
FIG. 6 is a front view, as seen from along a film conveying direction, of a film holder set in a film supplying section in the image input device relating to the embodiments of the present invention.

As shown in FIG. 3, a film holder 82 is provided at the film supplying section 71 at the inner side of the film holder cover 74. The leading end portion of the film bundle 72 is loaded in the film holder 82. As shown in FIG. 6, the film holder 82 is provided with a holding hardware 84 which is bent in a substantial U-shape. The interval between the plate portions at the both sides of the holding hardware 84, which interval is along the transverse direction of the photographic film 26, is, at the proximal end portion, substantially equal to the width of the photographic film 26, and becomes more narrow in a taper form toward from the proximal end portion toward the open end.

As shown in FIG. 6, a lever member 90, which connects the holding hardware 84 to the top surface of the AFL unit 70 via a connecting shaft 88, is provided at the film holder 82. In this way, the film holder 82 is supported so as to be able to swing around the connecting shaft 88 between a predetermined supply position and a predetermined loading position. Here, when the film holder 82 is at the loading position, which is reached by the film holder 82 being swung substantially 90° clockwise from the supply position illustrated in FIG. 6, the film bundle 72 can be loaded into the film holder 82 by the operator. As shown in FIG. 4, a holder sensor 91, which detects the film holder 82 in the supply position and outputs a detection signal, is disposed at the film supplying section 71.

When the film bundle 72 is to be loaded into the film holder 82, first, the operator opens the film holder cover 74 and swings the film holder 82 to the loading position. Thereafter, the operator sets uniform the leading end portions (the end portions at the side of the recorded image of the first frame) of the plural photographic films 26 forming the film bundle 72 such that the leading end portions are aligned, and places the film bundle 72 into the film accommodating chamber 76 as shown in FIG. 1. At this time, the film bundle 72 is wound around the outer peripheral side of the three guide pins 78 such that the film bundle 72 curves along the natural curl thereof, and the leftover portion at the trailing end side thereof is inserted at the inner peripheral side of the guide pins 78.

Next, the operator extends the leading end side of the film bundle 72 from the film accommodating chamber 76 toward the film holder 82 along the film guide path 80, and pushes the leading end portion of the film bundle 72 into the space between the both side plate portions of the holding hardware 84 of the film holder 82. At this time, as shown in FIG. 6, the leading end portion of the film bundle 72 is in a state in which the transverse direction central portion thereof is curved so as to swell toward the opening end side of the holding hardware 84, and the film side end portions are pressed into the interior of the holding hardware 84 so as to be pressed against the side plate portions of the holding hardware 84. In this way, the photographic films 26 forming the film bundle 72 are held by the holding hardware 84 such that the photographic films 26 can move in the longitudinal direction of the films with a small conveying resistance, but movement thereof in the film thickness direction is restricted. The photographic films 26 forming the film bundle 72 are loaded in the film holder 82 such that the front surfaces (emulsion surfaces) thereof face toward the proximal end portion side of the holding hardware 84.

An actuator 93 (see FIG. 4) is connected to the film holder 82. A feed roller 92 is provided at the film supplying section 71 so as to face the film bundle 72 set in the film holder 82 which is at the supplying position. The roller surface of the feed roller 92 is formed by a rubber or the like which is elastic and has a high coefficient of friction. Here, the actuator 93 moves the film holder 82, which is in the supplying position, along the direction of thickness of the film bundle 72 to either a predetermined press-contact position or a predetermined separated position. When the film holder 82 is moved to the press-contact position, the reverse surface of the photographic film 26 which is positioned at the bottommost portion of the film bundle 72 is made to press-contact the roller surface of the feed roller 92. When the film holder 82 is moved to the separated position, the film bundle 72 is moved away from the feed roller 92.

The feed roller 92 is connected to a feed motor 94 (see FIG. 4) via a torque transmitting mechanism (not shown). The feed roller 92 rotates in a predetermined feeding direction (the direction of arrow CCW) at the time of driving of the feed motor 94. Accordingly, when the film holder 82 moves from the separated position to the press-contact position at the time of driving of the feed motor 94, the one photographic film 26, which is positioned at the bottommost portion of the film bundle 72, is separated from the film bundle 72 set in the film holder 82, and this photographic film 26 is fed downstream along the longitudinal direction of the films due to the frictional force received from the portion which press-contacts the feed roller 92.

As shown in FIG. 4, a film sensor 95, which detects the film bundle 72 set in the film holder 82, is provided in the film supplying section 71 at the side beneath the film holder 82. The film sensor 95 outputs a detection signal at the time when the film bundle 72 (the photographic films 26) exist in the film holder 82 and the film holder 82 is at the supplying position.

A film supply path 96 is provided at the film supplying section 71 as shown in FIG. 4. The film supply path 96 is for guiding, to the image input device 12, the photographic film 26 which has been fed out from the film holder 82 by the feed roller 92. One end portion of the feed supply path 96 opens toward a vicinity of the upper end portion of the feed roller 92 such that the photographic film 26 which is fed out toward the image input device 12 by the feed roller 92 is inserted into the film supply path 96.

A connection opening 121, which opens toward the film carrier 46 side, is provided at the other end portion of the film supply path 96. As shown in FIG. 4, the connection opening 121 directly opposes the film supply opening 53 of the reading conveying path 52 with a predetermined clearance C therebetween. Here, the clearance C is set such that, even in a case in which the film carrier 46 is integral with the vibration isolating stand 44 and is displaced relative to the device frame, the distal end of the supply guiding portion 54 does not collide with the AFL unit 70.

As shown in FIG. 4, at the AFL unit 70, a first conveying roller pair 98, a first guide roller pair 102, a second conveying roller pair 100, and a second guide roller pair 104 are disposed along the film supply path 96 in that order from the upstream side. Here, the conveying roller pairs 98, 100 are each formed from a driving roller and a driven roller, and the torque from the feed motor 94 is transmitted to the driving rollers. Further, each of the guide roller pairs 102, 104 is formed by a pair of driven rollers.

A loop guide roller 106 is provided at the film supplying section 71 along the film supply path 96 between the second conveying roller pair 100 and the second guide roller pair 104. The loop guide roller 106 is supported such that a portion of the upper end side thereof projects from the lower surface of the film supply path 96. The loop guide roller 106 makes the photographic film 26, which has been fed in toward the second guide roller pair 104 from the second conveying roller pair 100, rise up slightly from the bottom surface of the film supply path 96. In this way, when the leading end side of the photographic film 26 is conveyed by the first conveying roller pair 56 of the film carrier 46 and the trailing end side of the photographic film 26 is conveyed by the second conveying roller pair 100 of the AFL unit 70, the formation of a loop portion 108 (see FIG. 3) which bends upward in the photographic film 26 between the second conveying roller pair 100 and the second guide roller pair 104 is promoted.

A loop detecting lever 110 and a loop sensor 112 for detecting the loop portion 108 formed in the photographic film 26 are provided at the film supply path 96 as shown in FIG. 4. The loop detecting lever 110 is supported so as to be swingable around a supporting shaft portion 114 provided at the downstream side of the loop guide roller 106. When the loop portion 108 is not detected, the loop detecting lever 110 is held by its own weight at a non-detecting position at which the distal end portion of the loop detecting lever 110 contacts the loop guide roller 106. A substantially fan-shaped striker portion 116 is provided integrally with the loop detecting lever 110 so as to project upwardly in a vicinity of the shaft supporting portion 114.

When the loop portion 108 is formed in the photographic film 26, the distal end portion of the loop detecting lever 110 is pushed upward by the loop portion 108 such that the loop detecting lever 110 is swung in one direction (counterclockwise in FIG. 4) from the non-detecting position. At this time, when a loop portion 108 (see FIG. 3) of a predetermined size is formed in the photographic film 26, the loop sensor 112 detects the striker portion 116 of the loop detecting lever 110, and outputs a loop detection signal. At the AFL unit 70, the driving of the feed motor 94 is controlled on the basis of this loop detection signal.

Here, the second guide roller pair 104 positioned at the downstream side of the loop portion 108 is formed by two driven rollers, and apply to the photographic film 26 only a slight conveying resistance which is needed in order to maintain the loop portion 108. As a result, when the tension of the photographic film 26 increases at the downstream side of the second guide roller pair 104, the photographic film 26 in which the loop portion 108 is formed is fed to the downstream side of the second guide roller pair 104 such that the tension of the photographic film 26 is reduced.

A film receiving section 118 is provided at the AFL unit 70 beneath the film supplying section 71 as shown in FIG. 4. The film receiving section 118 receives the photographic film 26 which has been discharged out from the film supply opening 53 of the reading conveying path 52. One end portion of a film feed-out path 120 is connected to the film receiving section 118. The film feed-out path 120 guides, to the interior of the film receiving section 118, the photographic film 26 which has been discharged out from the film supply opening 53. The other end portion of the film feed-out path 120 is connected to a region of the film supply path 96 which is slightly upstream of the connection opening 121.

A conveying merging section 122 is provided at the film supply path 96 at the portion thereof which connects with the film feed-out path 120. As shown in FIG. 4, the conveying merging section 122 forms a substantially wedge-shaped space whose width decreases toward the connection opening 121, between the upper surface of the film supply path 96 and the bottom surface of the film feed-out path 120. A pair of guide rollers 124, 126 is disposed at the conveying merging section 122. The guide roller 124 is supported such that the lower end portion thereof projects from the upper surface of the film supply path 96 into the conveying merging section 122. The guide roller 126 is supported such that the upper end portion thereof projects from the bottom surface of the film feed-out path 120 into the conveying merging section 122.

As shown in FIG. 4, a substantially wedge-shaped gate lever 128, whose width decreases toward the connection opening 121, is disposed in the conveying merging section 122. The gate lever 128 is supported so as to be swingable between a predetermined first guide position and a predetermined second guide position, around a swinging shaft 129 which is provided at the end portion of the gate lever 128 at the side opposite the connection opening 121. The gate lever 128 is always urged toward the first guide position, which is shown in FIG. 4, by an urging member (not shown) such as a coil spring or the like. Here, the distal end portion of the gate lever 128 which is at the first guide position press-contacts the roller surface of the guide roller 124. In this way, due to the gate lever 128, the guide supply path 96 within the conveying merging section 122 is closed, and the photographic film 26, which is conveyed toward the conveying merging section 122 through the connection opening 121 at the bottom surface side is guided to enter the film feed-out path 120.

When the photographic film 26 is conveyed to the conveying merging section 122 from the upstream side of the film supply path 96, the gate lever 128 is pushed by the leading end portion of the photographic film 26 and swings from the first guide position to the second guide position. In this way, the photographic film 26 can pass between the guide roller 124 and the gate lever 128, and is guided by the upper surface side of the gate lever 128 so as to be discharged from the connection opening 121.

At the film supplying section 71, along the film supply path 96, a first film sensor 130 is provided slightly downstream of the first conveying roller pair 98 and a second film sensor 132 is provided slightly upstream of the conveying merging section 122, as shown in FIG. 4. The films sensors 130, 132 detect the photographic film 26 within the film supply path 96, and output a detection signal.

As shown in FIG. 4, in the film receiving section 118, a discharge roller pair 138, which is formed by a driving roller 134 and a driven roller 136, faces the opening of the film feed-out path 120. Here, the driving roller 134 is supported beneath the opening of the film feed-out path 120 in the heightwise direction, and the driven roller 136 is supported above the film feed-out path 120 in the heightwise direction. Further, a discharge motor 140, which is connected to the driving roller 134 via a torque transmitting mechanism (not shown), and an actuator 142, which is connected to the driven roller 136 via a roller frame 143, are provided in the film receiving section 118.

The actuator 142 is formed from, for example, an electromagnetic solenoid, or a cam mechanism driven by a motor. The actuator 142 moves the driven roller 136, along a direction orthogonal to the film feed-out direction by the discharge roller pair 138, between a closed nip position at which the driven roller 136 press-contacts the driving roller 134 and an open nip position at which the driven roller 136 is separated from the driving roller 134. The discharge motor 140, at the time of driving thereof, rotates the driving roller 134 in a predetermined direction (the clockwise direction in FIG. 4). Here, when the driven roller 136 is moved to the open nip position by the actuator 142, the discharge roller pair 138 is in a withdrawn state of being withdrawn from the photographic film 26 which is fed into the film feed-out path 120 from the reading conveying path 52 by the conveying roller pairs 56, 58, 60 of the film carrier 46. Further, when the driven roller 136 is moved to the closed nip position by the actuator 142, the discharge roller pair 138 is in a conveying state in which the photographic film 26 discharged from the film feed-out path 120 can be nipped by the nip portion and the photographic film 26 can be pulled into the film receiving section 118.

At the film receiving section 118, as shown in FIG. 4, the axial center of the driven roller 136 is offset, toward the downstream side and by a predetermined distance along the film discharge direction, from the axial center of the driving roller 134. In this way, the nip portion of the driving roller 134 and the driven roller 136 which are at the closed nip position is formed at the film discharging direction downstream side of the axial center of the driving roller 134, as shown in FIG. 3.

Figure 8:
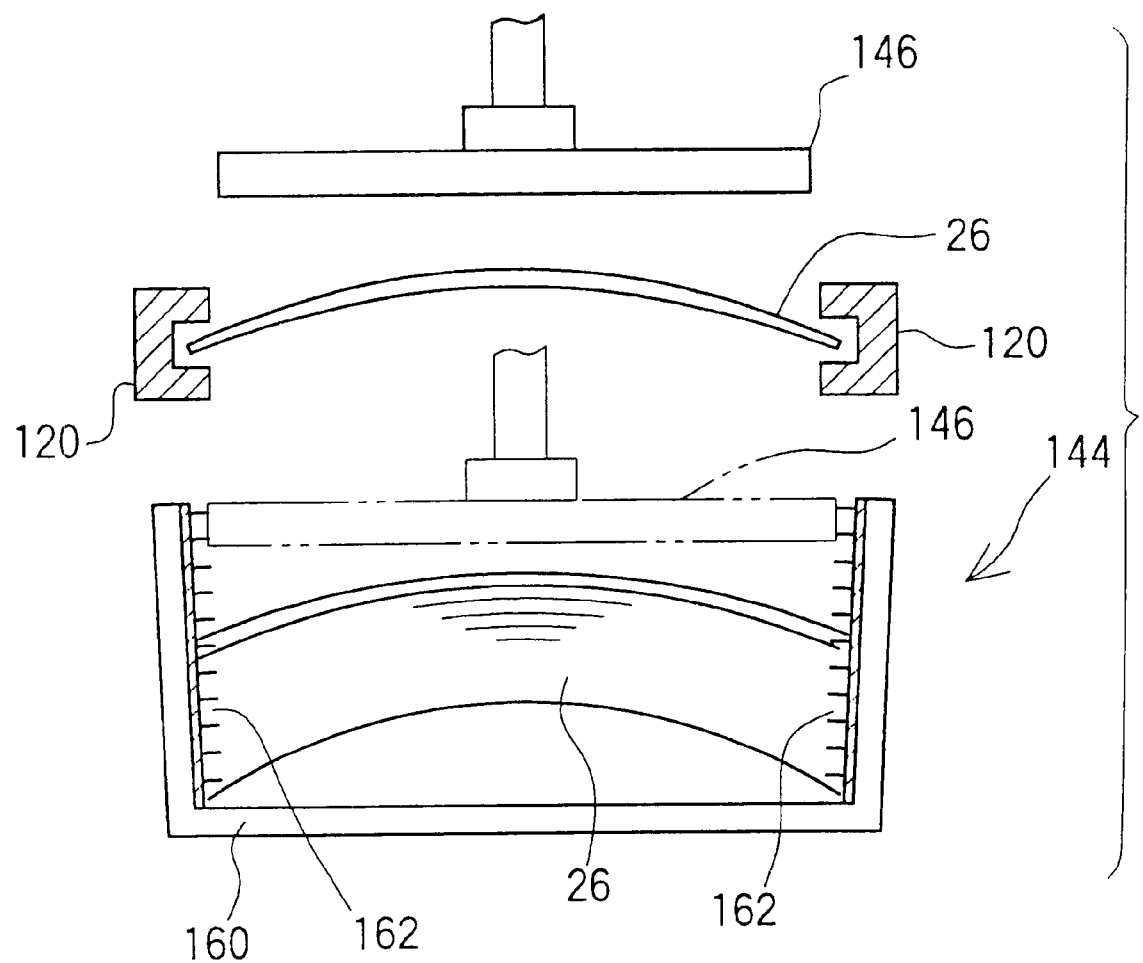
FIG. 8 is a front view, as seen from along a film conveying direction, of a film holder and a pressing member provided in the image input device relating to the embodiments of the present invention.

A film holder 144 is disposed in the film receiving section 118 at the downstream side of the discharge roller pair 138 along the film discharging direction, as shown in FIG. 4. The film holder 144 is provided with a holding hardware 160, which is bent in a substantial U-shape as shown in FIG. 8, and anchor guide members 162 which are adhered to the inner sides of the side plate portions of the holding hardware 160. The anchor guide member 162 is formed in a sheet-like shape, and a plurality of extremely small projections which are flexible are formed at one side surface thereof.

As shown in FIG. 4, a presser member 146, which is elongated and plate-shaped, and an actuator 148, which is connected to the top surface portion of the presser member 146, are provided above the film holder 144 in the film receiving section 118. The presser member 146 is supported such that the longitudinal direction thereof is substantially parallel to the film feed-out direction of the discharge roller pair 138. The actuator 148 moves the presser member 146, along a direction substantially orthogonal to the film feed-out direction, to either a predetermined pressing position or a predetermined standby position. Here, when the presser member 146 moves to the pressing position, the presser member 146 is inserted into the holding hardware 160 of the film holder 144 as shown by the imaginary line in FIG. 8. Further, when the presser member 146 is moved to the standby position, the presser member 146 is separated from the film holder 144 as shown by the solid line in FIG. 8.

As shown in FIG. 8, in the state in which the photographic film 26 is between the presser member 146 and the film holder 144, when the actuator 148 moves the presser member 146 from the standby position to the pressing position, both end portions of the photographic film 26 are pressed by the presser member 146, and the photographic film 26 is inserted into the holding hardware 160. In this way, the photographic film 26 is anchored by the anchor guide members 162 of the film holder 144, and is held in the holding hardware 160 by the holding force from the anchor guide members 162. At this time, the anchor guide members 162 apply to the photographic film 26 a holding force which is sufficiently large to stop the photographic film 26 within the holding hardware 160 against the weight of the photographic film 26.

A film sensor 150 is provided in the film receiving section 118 slightly upstream of the film discharge opening of the film feed-out path 120, as shown in FIG. 4. The film sensor 150 detects the photographic film 26 within the film feed-out path 120, and outputs a detection signal.

Figure 7:
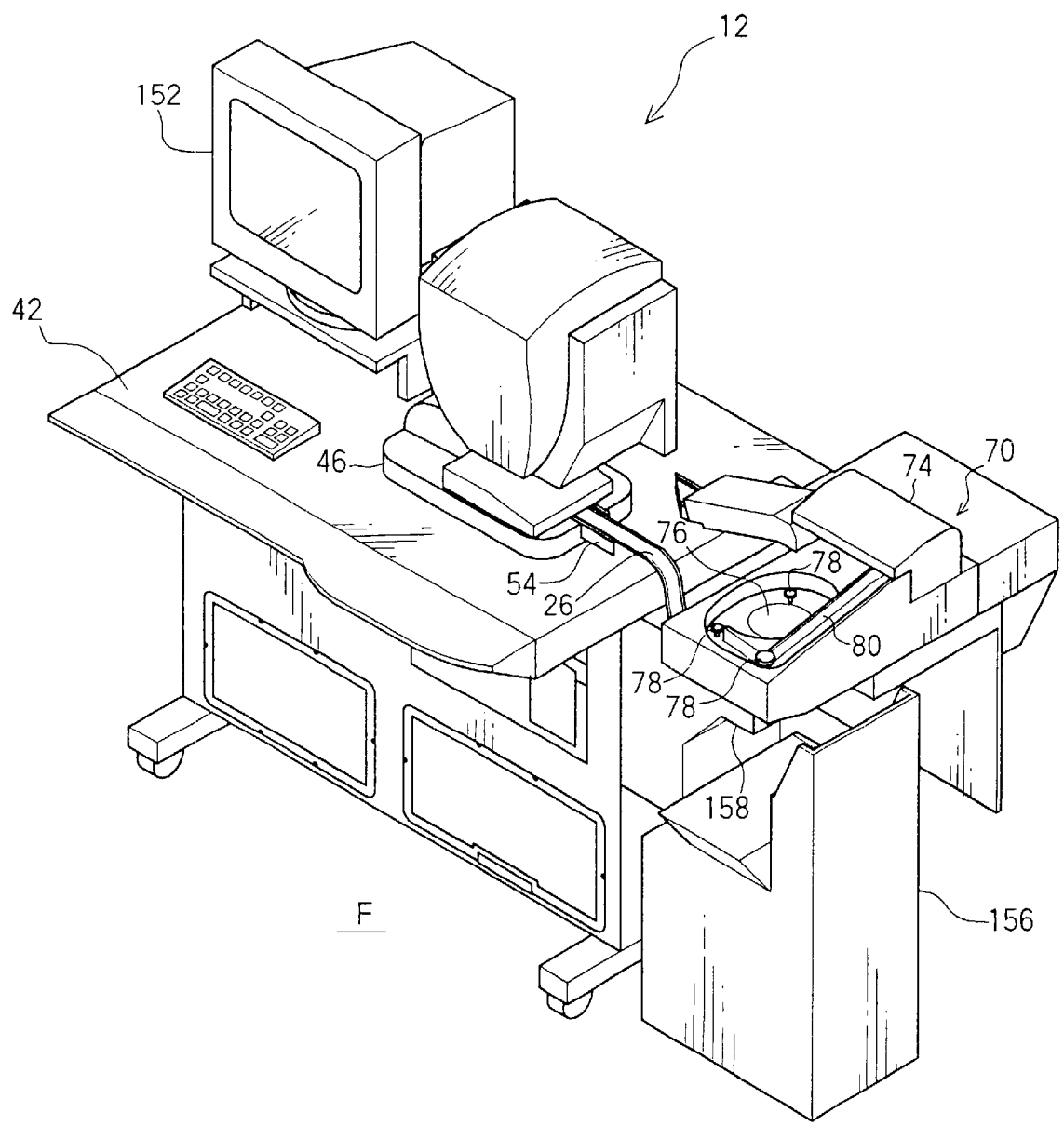
FIG. 7 is a perspective view showing the exterior of the image input device relating to the embodiments of the present invention, and illustrates a state in which the AFL unit is withdrawn backward.

In the image input device 12 of the present embodiment, when the AFL unit 70 is not used, as shown in FIG. 7, the AFL unit 70 is slid to the rear, and the film supply path 96 and the film feed-out path 120 are cut off from the reading conveying path 52 of the film carrier 46. In this way, by sliding the AFL unit 70 toward the rear, the photographic film 26 can be directly inserted from the film supply opening 53 (see FIG. 4) into the reading conveying path 52. Further, in this state in which the AFL unit 70 is slid to the rear, the photographic film 26, which is discharged from the reading conveying path 52 after fine scanning is completed, drops down into and is accommodated in a film feed-out container 158 fixed to the outer side surface of the image input device 12.

Operation of the Embodiment

Figure 10:
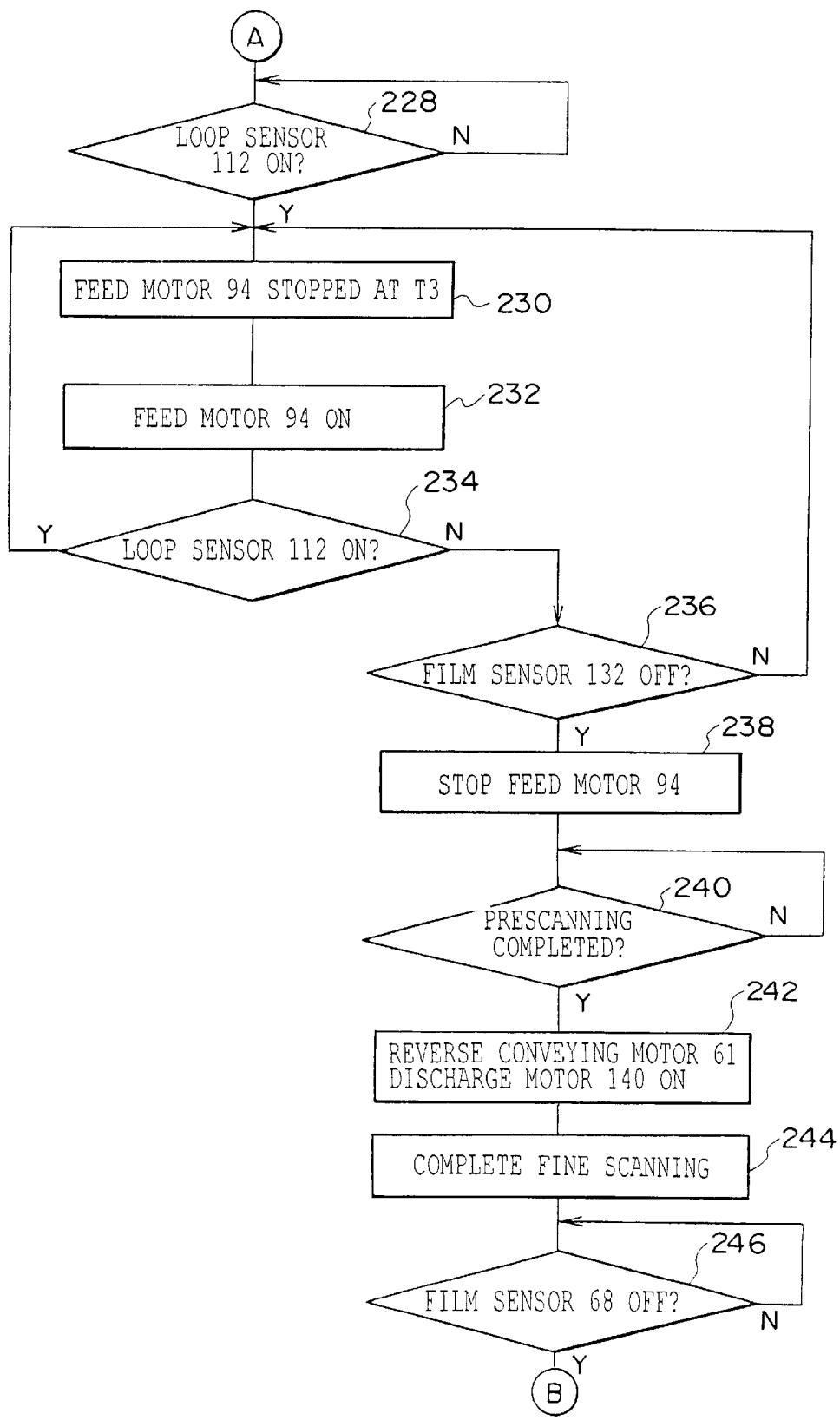
FIG. 10 is a control flowchart showing photographic film conveying control in the image input device relating to the first embodiment of the present invention.
Figure 11:
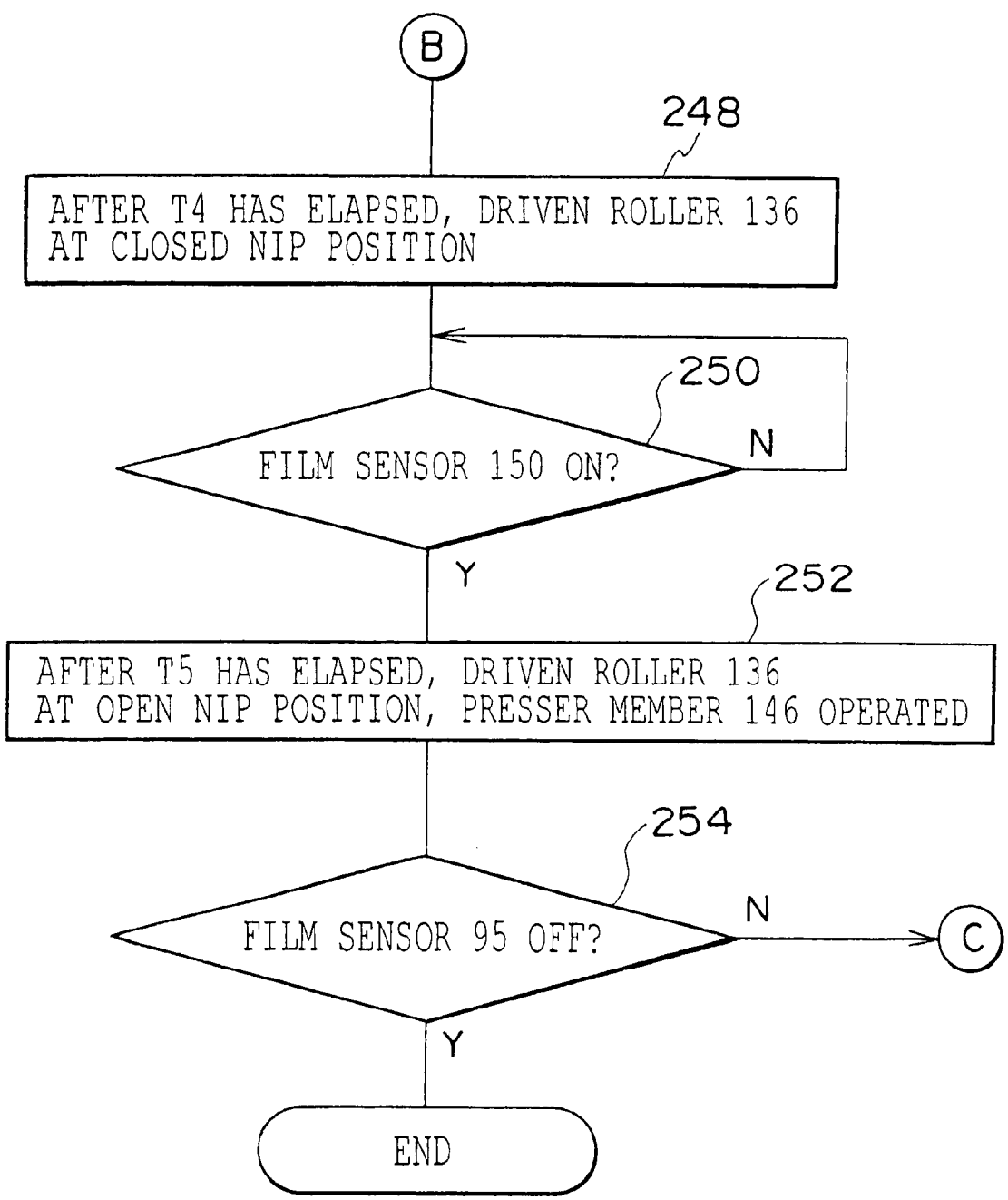
FIG. 11 is a control flowchart showing photographic film conveying control in the image input device relating to the first embodiment of the present invention.

Operation of the image input device 12 relating to the embodiment of the present invention will be described hereinafter on the basis of the flowcharts of FIGS. 9 through 11. The film bundle 72, which is formed from a plurality of photographic films 26 which have been developed, is already set in the film holder 82 of the film supplying section 71. Further, the series of operations shown in FIGS. 9 through 11 are controlled by a control section (not shown) of the image input device 12.

Figure 9:
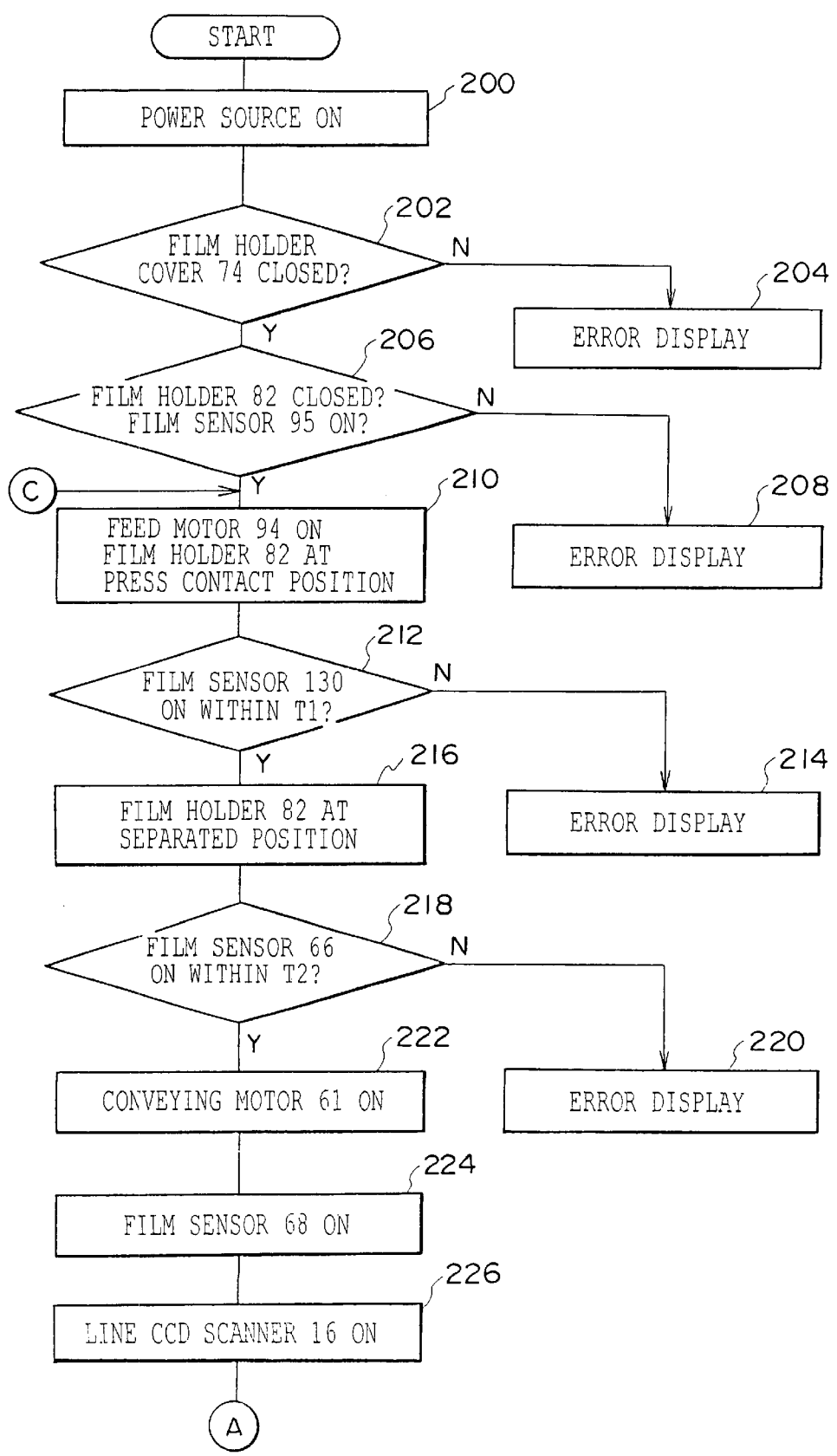
FIG. 9 is a control flowchart showing photographic film conveying control in an image input device relating to a first embodiment of the present invention.

As shown in FIG. 9, in step 200, the power source of the image input device 12 is turned on. In step 202, on the basis of a detection signal from the cover sensor 81, a determination is made as to whether the film holder cover 74 is closed. If it is judged in step 202 that the film holder cover 74 is not closed, the routine moves on to step 204 where it is displayed that the device is in an error state by an error message being displayed on a display portion 152 (see FIG. 1) or by an LED 154 (see FIG. 3) blinking. Note that, in the following steps as well, when it is displayed that the device is in an error state, operation of the image input device 12 is temporarily stopped until the operator carries out a processing by which the error state is reset.

If it is judged in step 202 that the film holder cover 74 is closed, the routine moves to step 206 where, on the basis of the detection signal from the holder sensor 91, it is judged whether or not the film holder 82 is at the closed position, and on the basis of the detection signal from the film sensor 95, it is judged whether the film bundle 72 (photographic films 26) exists at the film holder 82. When the film holder 82 is not at the closed position and the film bundle 72 is not in the film holder 82, the routine moves on to step 208 where it is displayed that the device is in an error state.

In step 206, when the film holder 82 is at the closed position and the film bundle 72 is at the film holder 82, the routine moves on to step 210 wherein the driving of the feed motor 94 is started and the film holder 82 is moved from the separated position to the press-contact position by the actuator 93. In this way, the photographic film 26 which is positioned at the lowermost portion of the film bundle 72 set in the film holder 82 is fed into the film supply path 96, and is inserted into the nip portion of the first conveying roller pair 98.

In step 212, a determination is made as to whether or not the leading end of the photographic film 26 has been detected, within a predetermined threshold time $T_1$, by the first film sensor 130 which is disposed slightly downstream of the first conveying roller pair 98. If the leading end of the photographic film 26 is not detected by the first film sensor 130 within the threshold time $T_1$, the routine moves on to step 214, and it is displayed that the device is in an error state. Further, when the leading end of the photographic film 26 is detected by the first film sensor 130 within the threshold time $T_1$, the routine moves on to step 216 where the film holder 82 is moved from the press-contact position to the separated position by the actuator 93.

After the film holder 82 is moved to the separated position, the photographic film 26 is conveyed along the film supply path 96 by the conveying roller pairs 98, 100. When the leading end portion of the photographic film 26 reaches the conveying merging section 122, the gate lever 128, which is at the first guide position, is swung to the second guide position against the urging force. In this way, the photographic film 26 is conveyed between the guide lever 128 and the guide roller 124 to the connection opening 121, and enters from the connection opening 121 into the reading conveying path 52 of the film carrier 46.

In step 218, a determination is made as to whether, after the leading end of the photographic film 26 has been detected by the first film sensor 130, the leading end of the photographic film 26 is detected by the first film sensor 66 of the film carrier 46 within a predetermined threshold time $T_2$. If the leading end of the photographic film 26 has not been detected by the first film sensor 66 in the film carrier 46 within the threshold time $T_2$, the routine moves on to step 220 where it is displayed that the device is in an error state. Further, if the leading end of the photographic film 26 has been detected by the first film sensor 66 in the film carrier 46 within the threshold time $T_2$, the routine moves on to step 222 where driving of the conveying motor 61 of the film carrier 46 is started. At this time, the conveying motor 61 is controlled so as to rotate in the forward rotating direction at a speed corresponding to the prescanning speed of the photographic film 26. In this way, the conveying roller pairs 56, 58, 60 of the film carrier 46 begin to rotate at the same speed in the direction (forward rotating direction) of conveying the photographic film 26 from the film supply opening 53 toward the film wind-up section 64.

Even after the leading end is detected by the first film sensor 66 in the film carrier 46, the photographic film 26 is conveyed in the reading conveying path 52 by the conveying force from the film supplying section 71, until the leading end portion is inserted into the nip portion of the first conveying roller pair 56. In this way, the leading end side of the photographic film 26 starts to be conveyed by the first conveying roller pair 56 of the film carrier 46. Thereafter, when the leading end of the photographic film 26 is detected by the second film sensor 68 in the film carrier 46 disposed between the conveying roller pairs 56, 58, synchronously therewith, the control section starts driving of the line CCD scanner 16 (steps 224–226).

Thereafter, at the film carrier 46, the leading end of the photographic film 26 is successively inserted into the nip portions of the second conveying roller pair 58 and the third conveying roller pair 60, and the conveying of the photographic film 26 along the reading conveying path 52 by the conveying roller pairs 56, 58, 60 is carried out. At this time, at the reading position R, prescanning of the photographic film 26 by the line CCD scanner 16 is carried out. The prescanning data, which is obtained by reading at a low resolution the images recorded on the photographic film 26, is outputted from the line CCD. On the basis of this prescanning data, the control section recognizes characteristic amounts such as the number and positions of the image frames on the photographic film 26, the aspect ratio of each image, the density of each image, and the like. Further, the portion of the photographic film 26 for which prescanning has been completed is fed into the film wind-up section 64 from the reading conveying path 52 by the third conveying roller pair 60 and is wound up in a roll form.

The film conveying speed by the conveying roller pairs 56, 58, 60 of the film carrier 46 at the time of the above-described prescanning is set to be slower than the film conveying speed by the conveying roller pairs 98, 100 at the film supplying section 71. Accordingly, when the leading end of the photographic film 26, whose trailing end side is being conveyed by the second conveying roller pair 100 of the film supplying section 71, is inserted into the nip portion of the first conveying roller pair 56 of the film carrier 46, the loop portion 108 (see FIG. 3), which bends upwardly, begins to be formed in the photographic film 26 at the portion thereof between the second guide roller pair 104 and the second conveying roller pair 100 in the film supplying section 71. This loop portion 108 increases in accordance with the increase in the conveying time by both the conveying roller pair 100 of the film supplying section 71 and the conveying roller pair 56 of the film carrier 46. At this time, when the loop portion 108 becomes a predetermined size and the loop detecting lever 110 is swung to the detection position shown in FIG. 3, the loop sensor 112 outputs a loop detection signal 112.

In steps 228 through 236, when it is judged that the loop detection signal has been outputted from the loop sensor 112, driving of the feed motor 94 is restarted after the feed motor 94 of the film supplying section 71 is stopped for a preset stopping time $T_3$. This stopping time $T_3$ is set, on the basis of the conveying speed of the conveying roller pair 56 of the film carrier 46, to be a length of time during which the loop portion 108 does not disappear during stopping of the feed motor 94. The control section repeats the above-described control of intermittently driving the feed motor, until the trailing end of the photographic film 26 is detected by the second film sensor 132 which is disposed downstream of the second guide roller pair 104. In step 236, when the control section judges that the trailing end of the photographic film 26 has been detected by the second film sensor 132, the routine moves on to step 238 where the feed motor 94 is stopped.

When the tension of the photographic film 26 at the downstream side of the second guide roller pair 104, which is positioned downstream of the loop section 108, increases, the second guide roller pair 104 feeds a portion of the loop portion 108 toward the downstream side so as to decrease the tension of the photographic film 26. As a result, the increase in tension of the photographic film 26 between the second guide roller pair 104 and the first conveying roller pair 56 of the film carrier 46 can be suppressed, and the tension of the photographic film 26 can be made substantially uniform. Thus, variations in the reading speed at the reading position R due to variations in the tension of the photographic film 26 can be effectively suppressed.

In the present embodiment, synchronously with the turning on of the loop sensor 112 after formation of the loop portion 108, the feed motor 94 is stopped for a predetermined period of time (=$T_3$), then the feed motor 94 is driven until the loop sensor 112 is turned on. In this way, the loop portion 108 is maintained. However, the inclination of the loop detecting lever 110 from the non-detecting position may be continuously or discretely detected, and control may be carried out such that the rotational speed of the feed motor 94 is adjusted in accordance with the inclination of the loop detecting lever 110 and the size of the loop portion 108 is maintained substantially constant.

In step 240, when it is judged that prescanning at the reading position R has been completed, the rotation of the conveying motor 61, which is rotating in the forward rotating direction, is reversed, and rotation of the discharge motor 140 of the film receiving section 118 is started. Due to the reverse rotation of the conveying motor 61, the conveying direction of the photographic film 26 is also reversed, and conveying of the photographic film 26 along the reading conveying path 52 from the reading position R toward the film supply opening 53 is started. At this time, the conveying speed (reading speed) of the photographic film 26 is set on the basis of the prescanning data, and the reading conditions for the photographic film 26 are set at the line CCD scanner 16 on the basis of the prescanning data. In this way, the line CCD scanner 16 carries out fine scanning in which the images of the photographic film 26 passing through the reading position R are read at a high resolution in accordance with these reading conditions.

When the trailing end (the end portion at the side of the final frame) of the photographic film 26, which is being conveyed by the conveying roller pairs 56, 58, 60 at the time of fine scanning, is discharged from the reading conveying path 52, the trailing end of the photographic film 26 passes through the connection opening 121 and enters into the conveying merging section 122. The photographic film 26 is guided by the gate lever 128 which is held at the first guide position (see FIG. 4), and enters into the film feedout path 120. At this time, the driven roller 136 of the discharge roller pair 138 of the film receiving section 118 is held at the open nip position (see FIG. 4) by the actuator 142, such that the nip portion of the discharge roller pair 138 is open. Accordingly, the photographic film 26 which is being discharged from the film feed-out path 120 passes between the driven roller 136 and the driving roller 134, and enters into the film receiving section 118. At this time, the driving roller 134 contacts the reverse surface of the photographic film 26, which is being conveyed by the conveying force from the conveying roller pair 56 of the film carrier 46, and guides the trailing end portion of the photographic film 26 onto the film holder 144.

In steps 244 through 246, after fine scanning of all of the images of the photographic film 26 has been completed, a determination is made as to whether the leading end of the photographic film 26 has been detected by the film sensor 68 in the film carrier 46. In step 246, when the leading end of the photographic film 26 has been detected, in step 248, a time $T_4$, which is required from the time the leading end of the photographic film 26 is detected to the time that the leading end of the photographic film 26 separates from the nip portion of the conveying roller pair 56, is computed on the basis of the prescanning data. When the time $T_4$ has elapsed from the time that the leading end of the photographic film 26 is detected, the driven roller 136 of the discharge roller pair 138 is moved to the closed nip position by the actuator 142. In this way, substantially simultaneously with the leading end of the photographic film 26 separating from the nip portion of the conveying roller pair 56, the photographic film 26 is nipped by the nip portion of the discharge roller pair 138, and begins to be conveyed by the discharge roller pair 138 of the film receiving section 118 so as to be discharged from the film feed-out path 120 into the film receiving section 118. At this time, the discharge motor 140 rotates the driving roller 126 at high speed such that the film conveying speed by the discharge roller pair 138 is sufficiently faster than the film conveying speed by the conveying roller pair 56 at the time of fine scanning. In this way, after fine scanning is completed, the time until the photographic film 26 can be supplied into the reading conveying path 52 by the film supplying section 71 can be shortened.

In step 250, a determination is made as to whether the leading end of the photographic film 26 has been detected by the film sensor 150 of the film receiving section 118. When the leading end of the photographic film 26 is detected, the routine moves on to step 252 where, when a predetermined standby time $T_5$ has elapsed from the detection of the leading end of the photographic film 26, the actuator 142 is operated such that the driven roller 136 of the discharge roller pair 138 is moved to the open nip position. Simultaneously, the actuator 148 is operated to move the presser member 146 from the standby position to the pressing position, and after movement is completed, returns the presser member 146 to the standby position. Here, the standby time $T_5$ is set so as to be slightly shorter than the conveying time needed for the leading end of the photographic film 26 to be conveyed from the position of detection by the film sensor 150 to the nip portion of the discharge roller pair 138.

When the actuators 142, 148 are respectively operated at the film receiving section 118 at the aforementioned time, the discharge conveying roller pair 138 releases the photographic film 26 from the nip portion substantially simultaneously with the operation of the actuator 142. On the other hand, the presser member 146 contacts the photographic film 26 at an intermediate position between the standby position and the pressing position. Thus, after the actuator 148 is operated, a fixed delay time (0.2 to 0.3 sec in the present embodiment) is required until the presser member 146 contacts the photographic film 26. Thus, movement of the photographic film 26, which is released from the discharge roller pair 138, in the feed-out direction due to inertia and gravity is interrupted until the aforementioned delay time has elapsed. At the point in time when this delay time has elapsed, the leading end of the photographic film 26 moves slightly downstream of the region at which the nip portion of the driving roller 134 and the driven roller 136 is located.

At the point in time when the delay time has elapsed, the presser member 146 abuts the photographic film 26 and moves integrally with the photographic film 26 to the pressing position. In this way, a vicinity of the leading end of the photographic film 26 is inserted into the holding hardware 160 of the film holder 144, and is anchored by the extremely small projections of the anchor guides 162 so as to not fall down from the film holder 144. The photographic film 26 is inserted into the film holder 144 such that the leading end thereof substantially coincides with the leading ends of the photographic films 26 which have already been inserted into the film holder 144. The trailing end side of the photographic film 26 which is hanging down from the film receiving section 118 is inserted into the film feed-out container 156 (see FIG. 1) disposed below the AFL unit 70.

In step 254, on the basis of the detection signal from the film sensor 95 of the film supplying section 71, the presence or absence of the film bundle 72 (the photographic films 26) at the film holder 82 is judged. In a case in which the film bundle 72 is at the film holder 82, the routine returns to step 210, and conveying of the next photographic film 26 from the film holder 82 is started. If there is no film bundle 72 in the film holder 82, it is judged that reading of all of the photographic films 26 set in the film holder 82 has been completed, and the image input device 12 is controlled to be set in a standby state.

In the image input device 12 of the present embodiment, after the trailing end of the one photographic film 26, which has been fed out from the film holder 82 into the film supply path 96, is fed out to the reading conveying path 52, it is possible to supply the next photographic film 26 from the film holder 82 into the film supply path 96. Thus, after reading of a preceding photographic film 26 is completed, the time to convey the second and subsequent photographic films 26 to the reading position R is shortened. Therefore, for the second and subsequent photographic films 26, the trailing end of the photographic film 26, which has been fed out from the film holder 82 into the film supply path 96, is fed into the reading conveying path 52, and simultaneously, the next photographic film 26 can be fed out from the film holder 82 into the film supply path 96, and this photographic film 26 can be conveyed until the leading end thereof reaches the second film sensor 132.

In the above-described image input device 12 of the present embodiment, at the image reading time when the photographic film 26 is conveyed by the conveying roller pairs 56, 58, 60 of the film carrier 46 and the image of the photographic film 26 is read by the line CCD scanner 16, the actuator 142 holds the driven roller 136 at the open nip position, and the discharge roller pair 138 is set in the withdrawn state where it is withdrawn from the photographic film 26 which has been conveyed into the film receiving section 118 by the conveying roller pairs 56, 58, 60 of the film carrier 46. In this way, at the time of image reading of the photographic film 26 by the line CCD scanner 16, external forces, such as resistance to conveying, impact force, tensile force, and the like, which could change the conveying speed of the photographic film 26 by the conveying roller pairs 56, 58, 60, is not applied to the photographic film 26 from the discharge roller pair 138. Thus, the conveying speed of the photographic film 26 at the reading position R can be prevented from being changed due to force from the discharge roller pair 138. As a result, a deterioration in the accuracy of reading the image of the photographic film 26 by the line CCD scanner 16 due to fluctuations in the conveying speed can be prevented. Thus, a deterioration in image quality of the image reproduced by the image information from the line CCD scanner 16 can be prevented.

Further, in the image input device 12, after image reading of the photographic film 26 by the line CCD scanner 16 is completed, synchronously with the leading end of the photographic film 26 separating from the nip portion of the conveying roller pair 56 of the film carrier 46, the driven roller 136 is moved to the closed nip position by the actuator 142, and the discharge roller pair 138 is set in a conveying state in which conveying of the photographic film 26 is possible. In this way, the time for discharging the photographic film 26 from the film feed-out path 120 into the film receiving section 118 can be shortened. Thus, even if the film conveying speed by the discharge roller pair 138 is sufficiently faster than the film conveying speed by the conveying roller pair 56 at the time of fine scanning, a high tension which could damage the photographic film 26 is not generated at the portion of the photographic film 26 between the conveying roller pair 56 and the discharge roller pair 138, and the photographic film 26 can be discharged into the film receiving section 118 from the discharge roller pair 138 at a high speed.

Even in a case in which the driven roller 136 is moved to the closed nip position before the leading end of the photographic film 26 separates from the nip portion of the conveying roller pair 56, before the leading end of the photographic film 26 separates from the nip portion of the conveying roller pair 56, the rotational speed of the discharge motor 140 is controlled such that the film conveying speed by the discharge roller pair 138 is substantially equal to the film conveying speed by the conveying roller pair 56 at the time of fine scanning. After the leading end of the photographic film 26 separates from the nip portion of the conveying roller pair 56, even if the film conveying speed by the discharge roller pair 138 is fast, the photographic film 26 can be discharged into the film receiving section 118 by the discharge roller pair 138 at a high speed without a strong tension which could damage the photographic film 26 being generated.

In the present embodiment, the discharge roller pair 138, which is formed from the pair of rollers 134, 136, is provided in the film receiving section 118 in order to discharge the photographic film 26 to the film receiving section 118. However, a roller pair does not necessarily have to be used in order to discharge the photographic film 26. For example, as the discharge conveying mechanism may be provided a belt mechanism which is supported so as to be able to approach and move away from the photographic film 26, or a mechanism which has a nip portion which can nip and release a side end portion of the photographic film 26 and which can move this nip portion in a film discharging direction, or the like. Moreover, it is not absolutely necessary to discharge the photographic film 26 to the film receiving section 118 by using the single discharge roller pair 138. A plurality of discharge roller pairs may be provided along the film feed-out path 120, and the respective nip portions thereof can be opened and closed.

In the image input device 12 of the present embodiment, the photographic film 26 discharged into the film receiving section 118 is inserted into the film holder 144 by the presser member 146, and the leading end portion of the photographic film 26 is held by the film holder 144. In this way, the plural photographic films 26 discharged into the film receiving section 118 can be made to hang down into the film discharge container 156 from the film receiving section 118 in a state in which the leading ends of the photographic films 26 are substantially aligned. Thus, the plural photographic films 26 which have been subjected to image reading can be made into a film bundle in which the photographic films 26 are stacked in the order of image reading, and this film bundle can be easily removed from the film holder 144.

Further, in the image input device 12, the film supplying section 71, in which the photographic films 26 before image reading are set, and the film receiving section 118, which receives the photographic films 26 after image reading, are both disposed in the AFL unit 70. Thus, as compared with a conventional device in which the film supplying section and the film receiving section are disposed on opposite sides of the reading conveying path, the dimension along the transverse direction of the device, which is substantially parallel to the film conveying direction by the reading conveying path 52, can be shortened. Thus, less floor space is required for the image input device 12.

Hereinafter, an image input device relating to a second embodiment of the present invention will be described with reference to the drawings. Portions which are basically the same as those of the first embodiment are denoted by the same reference numerals as in the first embodiment, and description thereof is omitted.

Structure of the Embodiment

As shown in FIGS. 1 through 3, 5 through 8, and 12, the second embodiment is structured basically similar to the first embodiment.

Figure 13:
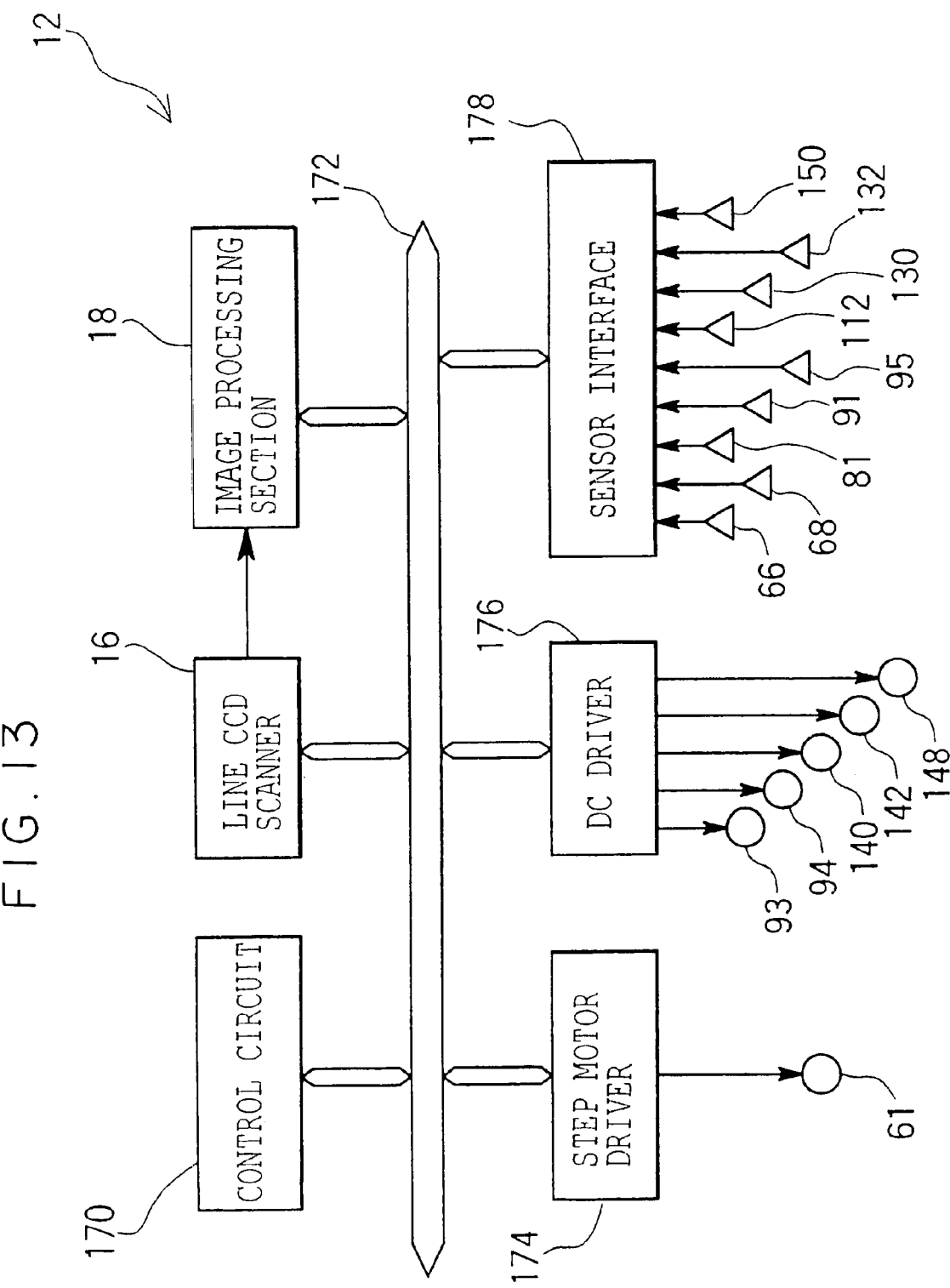
FIG. 13 is a block diagram showing a system structure of the image input device relating to the second embodiment of the present invention.

FIG. 13 is a block diagram showing the system structure of the image input device 12. The image input device 12 is provided with a control circuit 170 for controlling the entire device. Further, a data bus 174, which connects the line CCD scanner 16, the image processing section 18, a step motor driver 174, a DC driver 176, and a sensor interface 178 to the control circuit 170, is provided at the image input device 12. Here, upon receipt of control signals from the control circuit 170, the step motor driver 174 controls the driving of the conveying motor 61 of the film carrier 46, and the DC driver 176 controls the driving of the feed motor 94 and the actuator 93 of the film supplying section 71.

The sensor interface 178 transfers, via the data bus 172 and to the control circuit 170, the detection signals from the film sensors 66 in the film carrier 46, 68 in the film carrier 46 (FIG. 12) of the film carrier 46, the cover sensor 81 of the film supplying section 71, the holder sensor 91, the film sensors 95, 130, 132, and the loop sensor 112.

In the image input device 12 of the present embodiment, when the AFL unit 70 is not used, as shown in FIG. 7, the AFL unit 70 is slid to the rear, and the film supply path 96 and the film feed-out path 120 are cut off from the reading conveying path 52 of the film carrier 46. In this way, by sliding the AFL unit 70 toward the rear, the photographic film 26 can be directly inserted from the film supply opening 53 (see FIG. 12) into the reading conveying path 52. Further, in this state in which the AFL unit 70 is slid to the rear, the photographic film 26, which is discharged from the reading conveying path 52 after fine scanning is completed, drops down into and is accommodated in a film feed-out container 158 fixed to the outer side surface of the image input device 12.

Operation of the Present Embodiment

Figure 15:
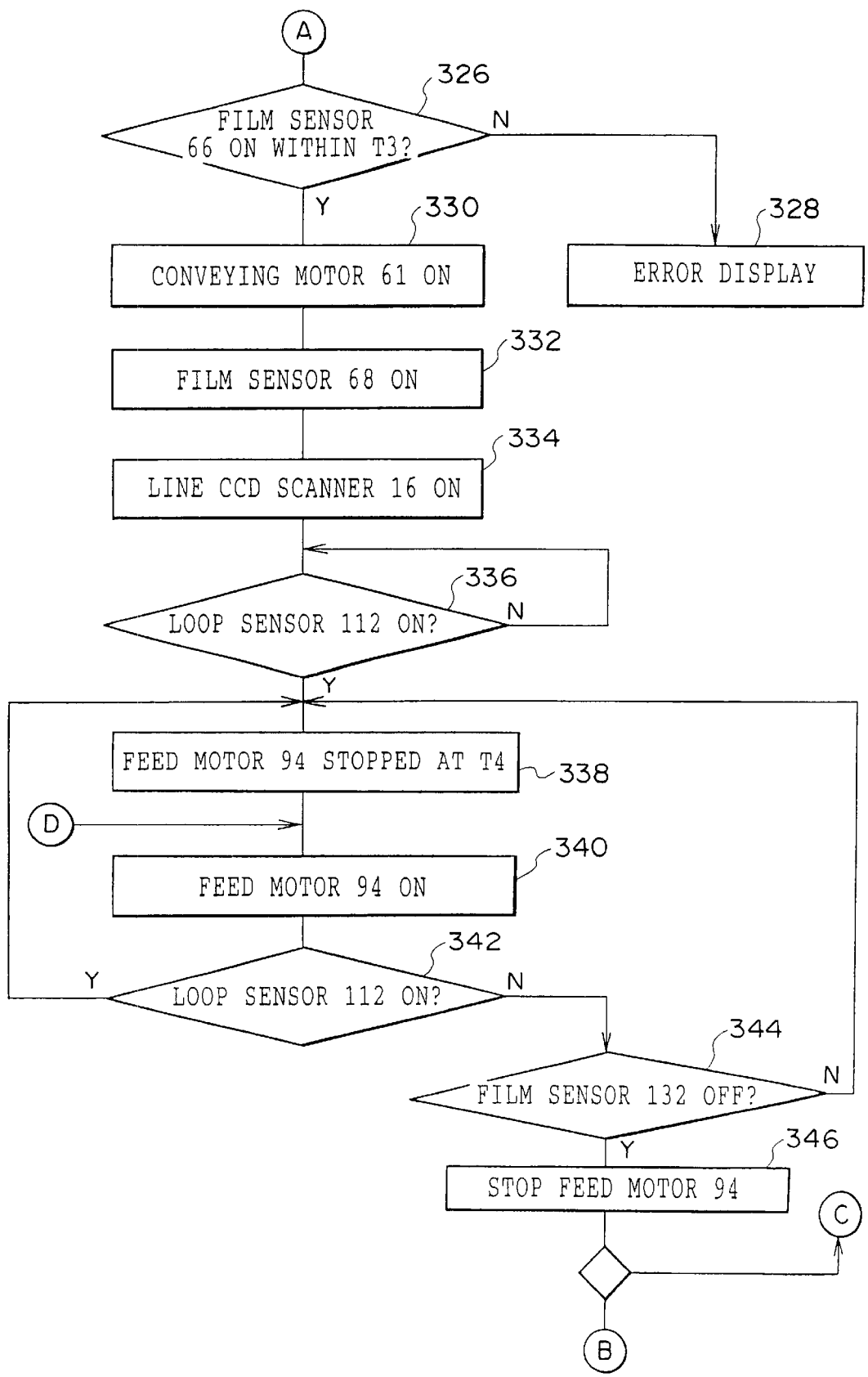
FIG. 15 is a control flowchart showing photographic film conveying control in the image input device relating to the second embodiment of the present invention.
Figure 16:
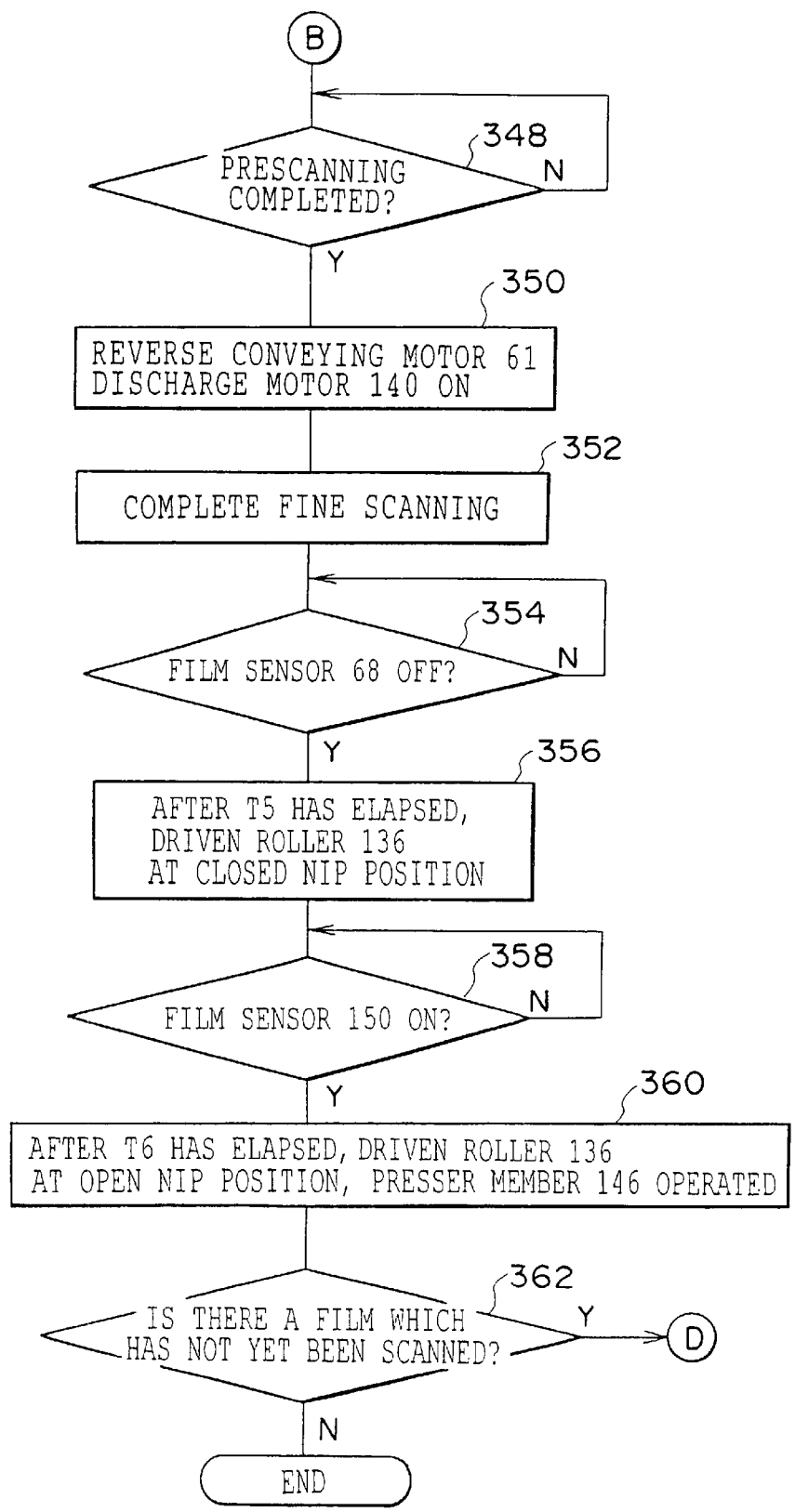
FIG. 16 is a control flowchart showing photographic film conveying control in the image input device relating to the second embodiment of the present invention.

Next, operation of the image input device 12 relating to the embodiment of the present invention will be described on the basis of the flowcharts of FIGS. 14 through 16. The film bundle 72, which is formed from a plurality of the photographic films 26 which have been developed, is already set in the film holder 82 of the film supplying section 17. Further, the series of operations shown in FIGS. 14 through 16 is controlled by the control circuit 170 (see FIG. 13) of the image input device 12.

Figure 14:
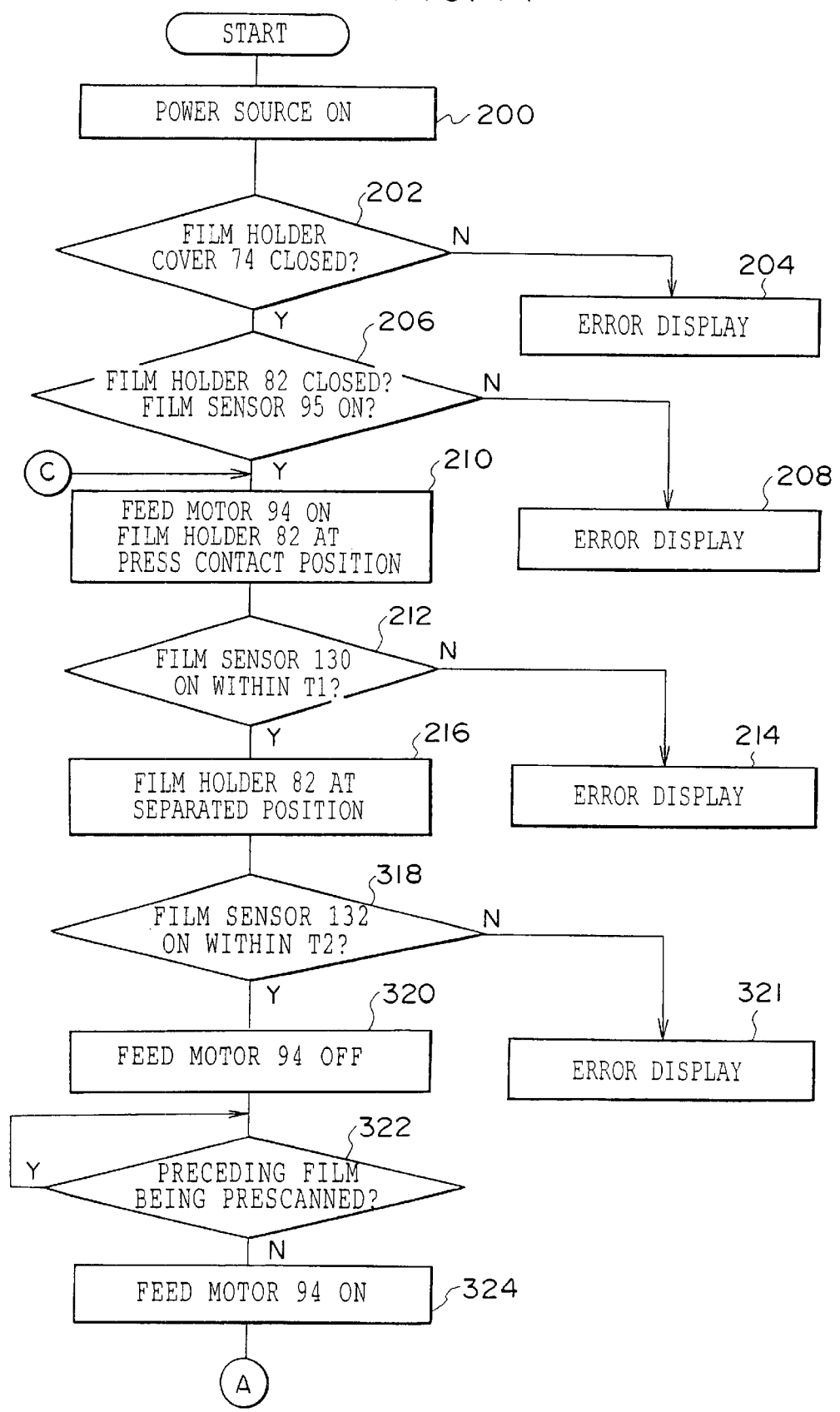
FIG. 14 is a control flowchart showing photographic film conveying control in the image input device relating to the second embodiment of the present invention.

In FIG. 14, the steps from the start until step 216 are the same as the steps from the start to step 216 in the first embodiment. Therefore, description thereof is omitted.

In step 318, a determination is made as to whether the leading end of the photographic film 26 has been detected by the second film sensor 132, which is set directly before the conveying merging section 122, within a predetermined threshold time $T_2$. If the leading end of the photographic film 26 has not been detected by the second film sensor 132 within the threshold time $T_2$, the routine moves on to step 321 where it is displayed that the device is in an error state. Further, when the leading end of the photographic film 26 is detected by the second film sensor 132 within the threshold time $T_2$, the routine proceeds to step 320, and the feed motor 94 is stopped.

In step 322, a determination is made as to whether image reading (prescanning and fine scanning) of the preceding (Nth) photographic film 26 is currently being carried out, or if image reading has been completed and discharge of the Nth photographic film 26 from the reading conveying path 52 has been completed. If it is determined in step 322 that image reading of the (Nth) photographic film 26 has been completed, the routine moves to step 324 where the driving of the feed motor 94 is started and conveying of the (N+1)st photographic film 26 is restarted.

In step 326, a determination is made as to whether, after the leading end of the photographic film 26 has been detected by the first sensor 130, the leading end of the photographic film 26 is detected by the first film sensor 66 of the film carrier 46 within a predetermined threshold time $T_3$. If the leading end of the photographic film 26 has not been detected by the first film sensor 66 in the film carrier 46 within the threshold time $T_3$, the routine moves on to step 328 where it is displayed that the device is in an error state. When the leading end of the photographic film 26 is detected by the first film sensor 66 in the film carrier 46 within the threshold time $T_3$, the routine proceeds to step 330 where driving of the conveying motor 61 of the film carrier 46 is started. At this time, the control circuit 170 controls the conveying motor 61 to rotate in the forward rotation direction at a speed corresponding to the prescanning speed of the photographic film 26. In this way, the conveying roller pairs 56, 58, 60 of the film carrier 46 begin to rotate at the same speed in the direction (forward rotation direction) of conveying the photographic film 26 from the film supply opening 53 toward the film wind-up section 64.

Even after the start of rotation of the conveying roller pairs 56, 58, 60, the photographic film 26 is conveyed in the reading conveying path 52 by the conveying force from the film supplying section 71, until the leading end portion of the photographic film 26 is inserted into the nip portion of the first conveying roller pair 56. In this way, the leading end side of the photographic film 26 begins to be conveyed by the first conveying roller pair 56 of the film carrier 46. Thereafter, when the leading end of the photographic film 26 is detected by the second film sensor 68 in the film carrier 46 disposed between the conveying roller pairs 56, 58, synchronously therewith, the control circuit 170 starts driving of the line CCD scanner 16 (steps 332 through 334).

Thereafter, at the film carrier 46, the leading end of the photographic film 26 is successively inserted into the nip portions of the second conveying roller pair 58 and the third conveying roller pair 60, and conveying of the photographic film 26 along the reading conveying path 52 by the conveying roller pairs 56, 58, 60 is carried out. At this time, prescanning is carried out on the photographic film 26 by the line CCD scanner 16 at the reading position R. The images recorded on the photographic film 26 are read at a low resolution, and prescanning data is outputted from the line CCD. On the basis of this prescanning data, the control circuit 170 recognizes characteristic amounts such as the number of and positions of image frames on the photographic film 26, the aspect ratio of each image, the density of each image and the like. The portion of the photographic film 26 for which prescanning has been completed is fed into the film wind-up section 64 from the reading conveying path 52 by the third conveying roller pair 60, and is wound up in roll form.

The film conveying speed by the conveying roller pairs 56, 58, 60 at the time of the above-described prescanning is set to be slower than the film conveying speed by the conveying roller pairs 98, 100 in the film supplying section 71. Accordingly, when the leading end of the photographic film 26, whose trailing end side is conveyed by the second conveying roller pair 100 of the film supplying section 71, is inserted into the nip portion of the first conveying roller pair 56 of the film carrier 46, the loop portion 108 (see FIG. 3), which bends upwardly, is formed in the photographic film 26 at the portion thereof between the second guide roller pair 104 and the second conveying roller pair 100 in the film supplying section 71. This loop portion 108 increases in accordance with the increase in the conveying time by both the conveying roller pair 100 of the film supplying section 71 and the conveying roller pair 56 of the film carrier 46. At this time, when the loop portion 108 becomes a predetermined size and the loop detecting lever 110 is swung to the detection position shown in FIG. 3, the loop sensor 112 outputs a loop detection signal.

In steps 336 through 344, when it is judged that the loop detection signal has been outputted from the loop sensor 112, driving of the feed motor 94 is restarted after the feed motor 94 of the film supplying section 71 is stopped for a preset stopping time $T_4$. This stopping time $T_4$ is set, on the basis of the conveying speed of the conveying roller pair 56 of the film carrier 46, to be a length of time during which the loop portion 108 does not disappear during stopping of the feed motor 94. The control circuit 170 repeats the above-described control of intermittently driving the feed motor 94, until the trailing end of the photographic film 26 is detected by the second film sensor 132 which is disposed downstream of the second guide roller pair 104. In step 344, when the control circuit 170 judges that the trailing end of the photographic film 26 has been detected by the second film sensor 132, the routine moves on to step 346 where the feed motor 94 is stopped.

At the time the above-described loop portion 108 is formed, when the tension of the photographic film 26 at the downstream side of the second guide roller pair 104, which is positioned downstream of the loop section 108, increases, the second guide roller pair 104 feeds a portion of the loop portion 108 toward the downstream side so as to decrease the tension of the photographic film 26. As a result, the increase in tension of the photographic film 26 between the second guide roller pair 104 and the first conveying roller pair 56 of the film carrier 46 can be suppressed, and the tension of the photographic film 26 can be made substantially uniform. Thus, variations in the reading speed at the reading position R due to variations in the tension of the photographic film 26 can be effectively suppressed.

In the present embodiment, synchronously with the turning on of the loop sensor 112 after formation of the loop portion 108, the feed motor 94 is driven, after being stopped for a predetermined period of time ($=T_4$), until the loop sensor 112 is turned on. In this way, the loop portion 108 is maintained. However, the inclination of the loop detecting lever 110 from the non-detecting position may be continuously or discretely detected, and control may be carried out such that the rotational speed of the feed motor 94 is adjusted in accordance with the inclination of the loop detecting lever 110 and the size of the loop portion 108 is maintained substantially constant.

In step 348, when it is judged that prescanning at the reading position AR has been completed, the rotation of the conveying motor 61, which is rotating in the forward rotating direction, is reversed, and rotation of the discharge motor 140 of the film receiving section 118 is started (step 350). Due to the reverse rotation of the conveying motor 61, the conveying direction of the photographic film 26 is also reversed, and conveying of the photographic film 26 along the reading conveying path 52 from the reading position R toward the film supply opening 53 is started. At this time, the conveying speed (reading speed) of the photographic film 26 is set on the basis of the prescanning data, and the reading conditions for the photographic film 26 are set at the line CCD scanner 16 on the basis of the prescanning data. In this way, the line CCD scanner 16 carries out fine scanning in which the images of the photographic film 26 passing through the reading position R are read at a high resolution in accordance with these reading conditions.

When the trailing end (the end portion at the side of the final frame) of the photographic film 26, which is being conveyed by the conveying roller pairs 56, 58, 60 at the time of fine scanning, is discharged from the reading conveying path 52, the trailing end of the photographic film 26 passes through the connection opening 121 and enters into the conveying merging section 122. The photographic film 26 is guided by the gate lever 128 which is held at the first guide position (see FIG. 12), and enters into the film feed-out path 120. At this time, the driven roller 136 of the discharge roller pair 138 of the film receiving section 118 is held at the open nip position (see FIG. 12) by the actuator 142, such that the nip portion of the discharge roller pair 138 is open. Accordingly, the photographic film 26 which is being discharged from the film feed-out path 120 passes between the driven roller 136 and the driving roller 134, and enters into the film receiving section 118. At this time, the driving roller 134 contacts the reverse surface of the photographic film 26, which is being conveyed by the conveying force from the conveying roller pair 56 of the film carrier 46, and guides the trailing end portion of the photographic film 26 onto the film holder 144.

In steps 352 through 354, after fine scanning of all of the images of the photographic film 26 has been completed, a determination is made as to whether the leading end of the photographic film 26 has been detected by the film sensor 68 in the film carrier 46. In step 356, when the leading end of the photographic film 26 has been detected in step 354, a time $T_5$, which is required from the time the leading end of the photographic film 26 is detected to the time that the leading end of the photographic film 26 separates from the nip portion of the conveying roller pair 56, is computed on the basis of the prescanning data. When the time $T_5$ has elapsed from the time that the leading end of the photographic film 26 is detected, the driven roller 136 of the discharge roller pair 138 is moved to the closed nip position by the actuator 142. In this way, substantially simultaneously with the leading end of the photographic film 26 separating from the nip portion of the conveying roller pair 56, the photographic film 26 is nipped by the nip portion of the discharge roller pair 138, and begins to be conveyed by the discharge roller pair 138 of the film receiving section 118 so as to be discharged from the film feed-out path 120 into the film receiving section 118. At this time, the discharge motor 140 rotates the driving roller 126 at high speed such that the film conveying speed by the discharge roller pair 138 is sufficiently faster than the film conveying speed by the conveying roller pair 56 at the time of fine scanning. In this way, after fine scanning is completed, the time until the photographic film 26 can be supplied into the reading conveying path 52 by the film supplying section 71 can be shortened.

In step 358, a determination is made as to whether the leading end of the photographic film 26 has been detected by the film sensor 150 of the film receiving section 118. When the leading end of the photographic film 26 is detected, the routine moves on to step 360 where, when a predetermined standby time $T_6$ has elapsed from the detection of the leading end of the photographic film 26, the actuator 142 is operated such that the driven roller 136 of the discharge roller pair 138 is moved to the open nip position. Simultaneously, the actuator 148 is operated to move the presser member 146 from the standby position to the pressing position, and after movement is completed, returns the presser member 146 to the standby position. Here, the standby time $T_6$ is set so as to be slightly shorter than the conveying time needed for the leading end of the photographic film 26 to be conveyed from the position of detection by the film sensor 150 to the nip portion of the discharge roller pair 138.

When the actuators 142, 148 are respectively operated at the film receiving section 118 at the aforementioned time, the discharge conveying roller pair 138 releases the photographic film 26 from the nip portion substantially simultaneously with the operation of the actuator 142. On the other hand, the presser member 146 contacts the photographic film 26 at an intermediate position between the standby position and the pressing position. Thus, after the actuator 148 is operated, a fixed delay time (0.2 to 0.3 sec in the present embodiment) is required until the presser member 146 contacts the photographic film 26. Thus, movement of the photographic film 26, which is released from the discharge roller pair 138, in the feed-out direction due to inertia and gravity is interrupted until the aforementioned delay time has elapsed. At the point in time when this delay time has elapsed, the leading end of the photographic film 26 moves slightly downstream of the region at which the nip portion of the driving roller 134 and the driven roller 136 is located.

At the point in time when the delay time has elapsed, the presser member 146 abuts the photographic film 26 and moves integrally with the photographic film 26 to the pressing position. In this way, a vicinity of the leading end of the photographic film 26 is inserted into the holding hardware 160 of the film holder 144, and is anchored by the extremely small projections of the anchor guides 162 so as to not fall down from the film holder 144. The photographic film 26 is inserted into the film holder 144 such that the leading end thereof substantially coincides with the leading ends of the photographic films 26 which have already been inserted into the film holder 144. The trailing end side of the photographic film 26 which is hanging down from the film receiving section 118 is inserted into the film feed-out container 156 (see FIG. 1) disposed below the AFL unit 70.

In step 362, the control circuit 170 judges whether there is, at either of the film supplying section 71 and the film carrier 46, a photographic film 26 for which fine scanning has not been carried out. Here, if there is a photographic film 26 for which fine scanning has not been carried out, the routine returns to step 244. Namely, in this case, when fine scanning of the preceding Nth photographic film 26 is carried out, the subsequent (N+1)st photographic film 26 stands-by at the position of the second film sensor 132 of the film supply path 96. When it is confirmed by the film sensor 150 that the Nth photographic film 26 has been discharged into the film feed-out path 120 from the conveying merging section 122, conveying of the (N+1)st photographic film 26 into the reading conveying path 52 via the conveying merging section 122 is started. Further, if there is no photographic film 26 for which fine scanning has not been carried out, it is judged that reading of all of the photographic films 26 set in the film holder 82 has been completed, and the image input device 12 is controlled to be set in a standby state.

In accordance with the image input device 12 of the above-described present embodiment, after the Nth photographic film 26, which is the Nth photographic film 26 for which image reading is carried out, begins to be conveyed by the conveying roller pairs 56, 58, 60 of the film carrier 46, synchronously with the passage of the trailing end of the Nth photographic film 26 through the conveying merging section 122, the control circuit 170 starts the conveying from the film holder 82 of the (N+1)st photographic film 26, which is the (N+1)st photographic film 26 for which image reading is carried out, and stops the (N+1)st photographic film 26 at the position where the leading end thereof is detected by the second film sensor 132. When the Nth photographic film 26 has been discharged from the conveying merging section 22 into the film feed-out path 120, due to the restarting of the conveying of the (N+1)st photographic film 26, it is possible to convey the (N+1)st photographic film 26 up to the position directly before the conveying merging section 122 and to stop the (N+1)st photographic film 26 at this position until conveying thereof to the reading conveying path 52 is possible, while the images of the Nth photographic film 26 are being read by the line CCD scanner 16 as the Nth photographic film 26 is being conveyed along the reading conveying path 52 by the conveying roller pairs 56, 58, 60. Thus, as compared with conventional control in which conveying of the (N+1)st photographic film 26 from the film holder 82 is started after the Nth photographic film 26 has been discharged from the reading conveying path 52, the period of time from the time when the Nth photographic film 26 is discharged from the reading conveying path 52 to the time when the next (N+1)st photographic film 26 is conveyed from the film supply path 96 into the reading conveying path 52, can be shortened.

As a result, the time for reading the plurality of photographic films 26 when successively reading, by the line CCD scanner 16, the photographic films 26 set in the film holder 82, can be shortened.

In the image input device 12 of the present embodiment, after conveying of the (N+1)st photographic film 26 from the film holder 82 is started, the leading end of the (N+1) st photographic film 26 is stopped at the position of the second film sensor 132 until the Nth photographic film 26 is discharged into the film feed-out path 120 from the conveying merging section 120. However, control can be carried out such that, without stopping the (N+1)st photographic film 26 at a predetermined position within the film supply path 96, the conveying speed of the (N+1)st photographic film 26 by the conveying roller pairs 98, 100 is adjusted such that the (N+1)st photographic film 26 is supplied to the reading conveying path 52 at the time when the Nth photographic film 26 is discharged from the conveying merging section 122 into the film feed-out path 120.

Further, in the image input device 12 of the present embodiment, at the time the photographic film 26 is conveyed by the conveying roller pairs 98, 100 of the film supplying section 71, the photographic film 26 enters into the reading conveying path 52 from the film supply path 96, and the trailing end of the photographic film 26 passes through the conveying merging section 122 at the film supply path 96. Thereafter, the gate lever 128 switches the conveying path of the photographic film 26 such that the photographic film 26 enters into the film feed-out path 120 from the reading conveying path 52. In this way, when the leading end of the photographic film 26 being conveyed along the film supply path 96 reaches the reading conveying path 52, due to the gate lever 128, the photographic film 26 enters into the reading conveying path 52 from the film supply path 96, and is conveyed along the reading conveying path 52 so as to pass through the reading position R. Further, after the trailing end of the photographic film 26 has passed the conveying merging section 122, when the conveying direction of the photographic film 26 is reversed and the trailing end of the photographic film 26 reaches the conveying merging section 122, the photographic film 26 enters into the film feed-out path 120 and is fed-out to the film receiving section 118 along the film feed-out path 120.

At this time, at the image input device 12, at the time the photographic film 26 is conveyed from the conveying merging section 122 toward the reading position R, prescanning of the photographic film 26 is carried out. At the time the photographic film 26 is conveyed from the reading position R toward the conveying merging section 122, fine scanning of the photographic film 26 is carried out. Accordingly, even if the photographic film 26 is elongated, the trailing end side of the photographic film 26 can be fed-out in the film receiving section 118 along the film feed-out path 120 while fine scanning of the photographic film 26 is being carried out. Thus, after fine scanning is completed, immediately after the leading end of the photographic film 26 passes through the conveying merging section 122, the next photographic film 26 can be supplied to the reading conveying path by the film supplying section 71.

Accordingly, as compared with a conventional device in which, after fine scanning of the photographic film 26 has been completed, the conveying direction of the photographic film 26 is reversed and the photographic film 26 is conveyed to the film receiving section which is disposed at the side opposite the film supplying section, the time until the next photographic film 26 can be supplied to the reading conveying path 52 after fine scanning is completed (i.e., the feed-out wait time) can be shortened. Further, even if the photographic film 26 is elongate, the feed-out wait time does not increase. For these reasons as well, the reading time at the time of successively reading images of a plurality of photographic films 26 by the line CCD scanner 16 can be shortened.

Further, in the image input device 12, the film supplying section 71, in which the photographic films 26 before image reading are set, and the film receiving section 118, which receives the photographic films 26 after image reading, are both disposed in the AFL unit 70. Thus, as compared with a conventional device in which the film supplying section and the film receiving section are disposed at opposite sides of the reading conveying path, the dimension along the transverse direction of the device, which is substantially parallel to the film conveying direction by the reading conveying path 52, can be shortened. Thus, less floor space is required for the image input device 12.

Hereinafter, an image input device relating to a third embodiment of the present invention will be described with reference to the drawings. Portions which are basically the same as those of the first embodiment are denoted by the same reference numerals as in the first embodiment, and description thereof is omitted.

Structure of the Embodiment

As shown in FIGS. 1 through 3, 5 through 8, and 12, the third embodiment is structured basically similarly to the first and the second embodiments.

Figure 12:
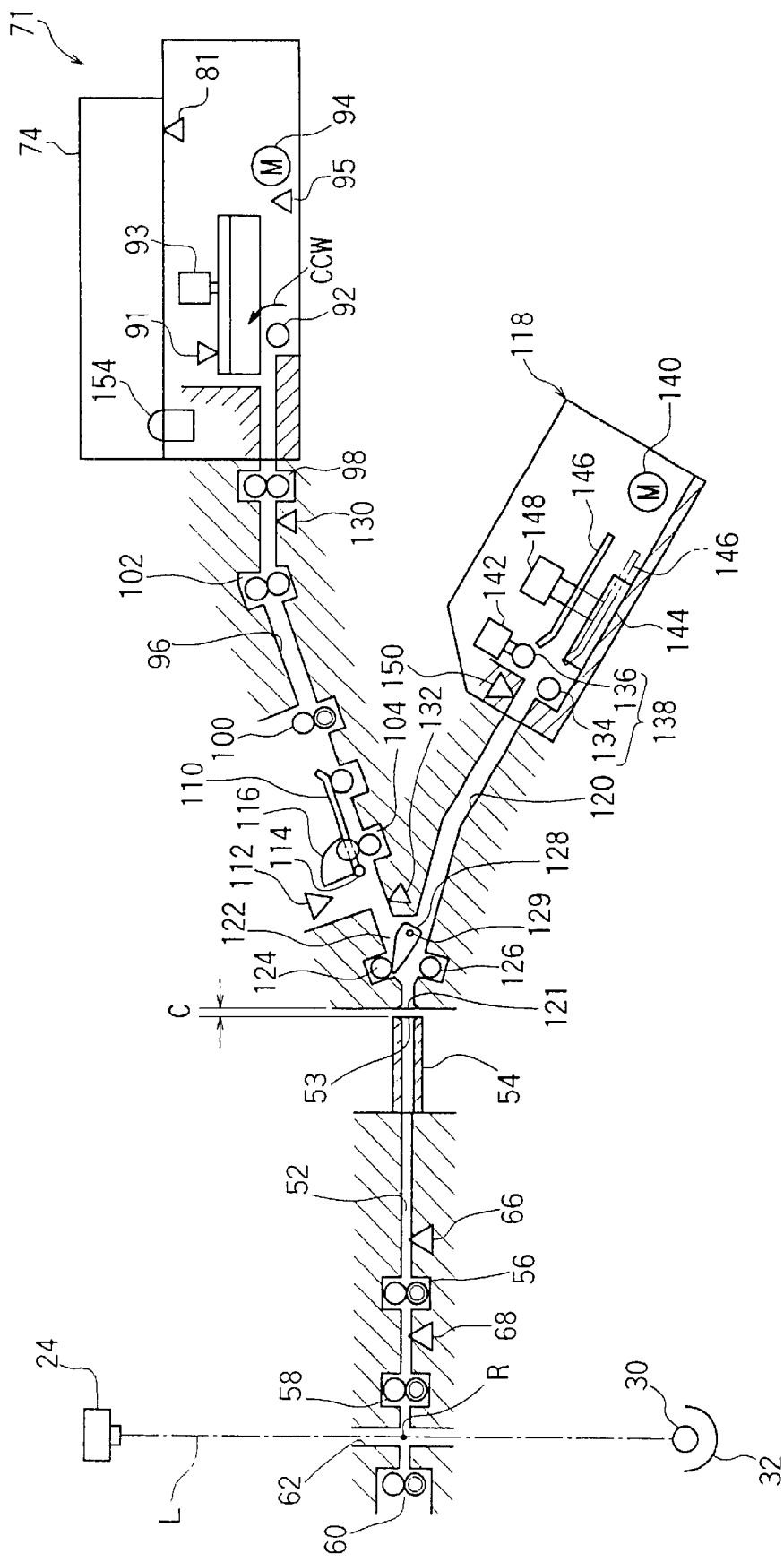
FIG. 12 is a side sectional view showing a structure, along a photographic film conveying path, in image input devices relating to second and third embodiments of the present invention.

In FIG. 12, at the time the discharge motor 140 is driven, the discharge motor 140 rotates the driving roller 134 in a predetermined discharging direction. Further, the actuator 142 moves the driven roller 136 up and down in an opening and closing direction which is substantially orthogonal to the film discharging direction so as to open and close the nip portion with the driving roller 134.

As shown in FIG. 12, at the film receiving section 118, the axial center of the driven roller 136 is offset, toward the downstream side and by a predetermined distance along the film feed-out direction, from the axial center of the driving roller 134. In this way, the nip portion of the driven roller 136 and the driving roller 134 is formed at the film feed-out direction downstream side of the axial center of the driving roller 134.

The film holder 144 is disposed in the film receiving section 118 at the downstream side of the discharge roller pair 138 along the film feed-out direction, as shown in FIG. 12. The film holder 144 basically has the same structure as that of the film holder 82 (see FIG. 6) of the film supplying section 71. Specifically, the film holder 144 is provided with a holding hardware and anchor guide members which are adhered to the side plate portions of the holding hardware 84. The holding hardware of the film holder 144 is fixed to the bottom surface of the film receiving section 118 such that the opening portion faces upward. Conversely to the holding hardware 84 of the film holder 82, the holding hardware of the film holder 144 becomes more wide in a taper form from the proximal end portion toward the opening portion thereof.

As shown in FIG. 12, the presser member 146, which is elongated and plate-shaped, and the actuator 148, which is connected to the presser member 146, are provided above the film holder 144. The presser member 146 is supported such that the longitudinal direction thereof is substantially parallel to the film feed-out direction of the discharge roller pair 138. The actuator 148 moves the presser member 146, along a direction substantially orthogonal to the film feed-out direction, to either a predetermined pressing position or a predetermined standby position. Here, when the presser member 146 moves to the pressing position, the presser member 146 is inserted into the film holder 144 as shown by the imaginary line in FIG. 12. Further, when the presser member 146 is moved to the standby position, the presser member 146 is separated from the film holder 144 as shown by the solid line in FIG. 12.

As shown in FIG. 12, at the film receiving section 118, the film sensor 150 is disposed slightly upstream of the film discharge opening of the film feed-out path 120. The film sensor 150 detects the photographic film 26 within the film feed-out path 120, and outputs a detection signal.

Operation of the Present Embodiment

Next, operation of the image input device 12 relating to the embodiment of the present invention will be described on the basis of the flowcharts of FIGS. 17 through 19. The film bundle 72, which is formed from a plurality of the photographic films 26 which have been developed, is already set in the film holder 82 of the film supplying section 71. Further, the series of operations shown in FIGS. 17 through 19 is controlled by a control section (not shown) of the image input device 12.

Figure 17:
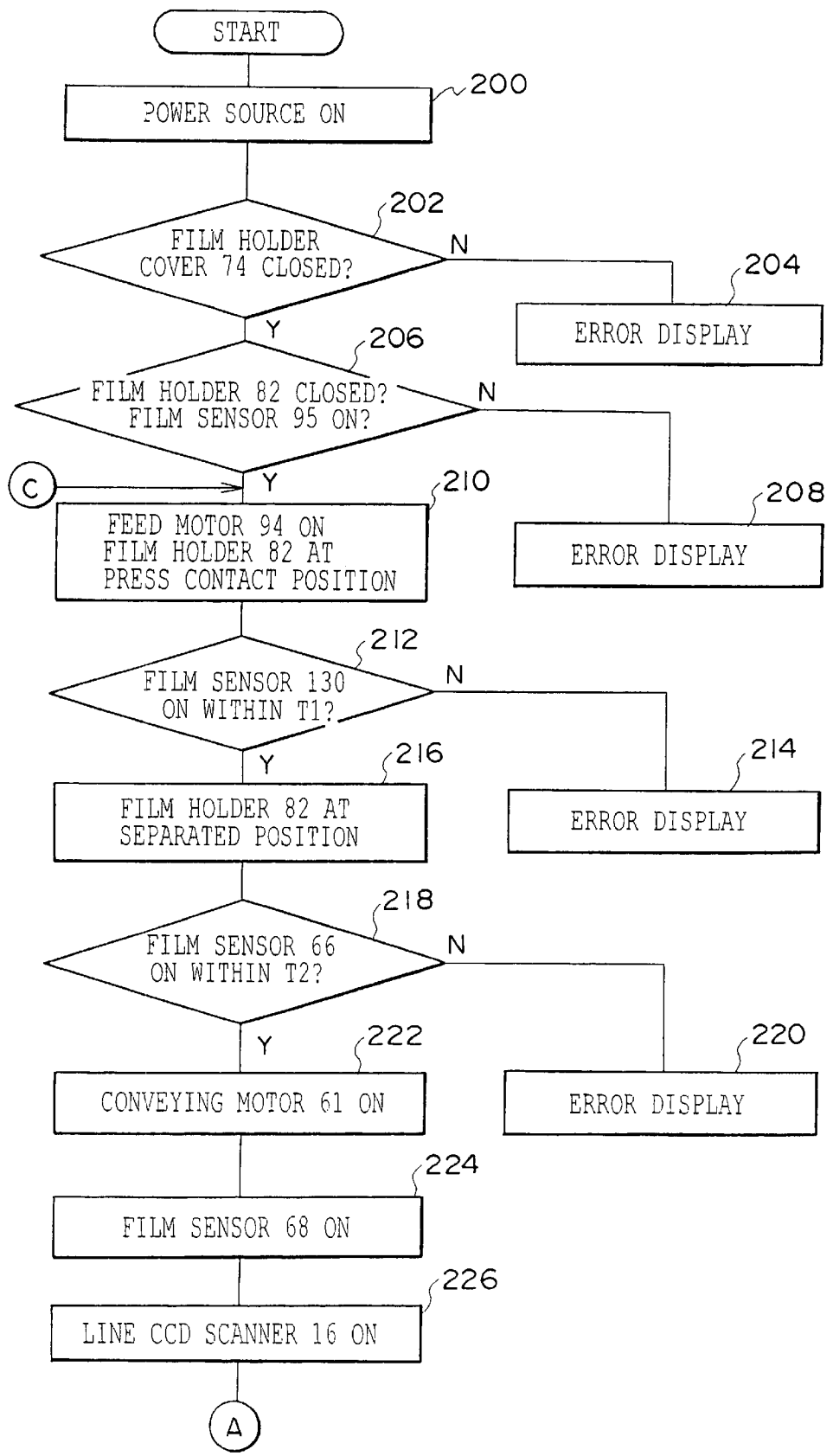
FIG. 17 is a control flowchart showing photographic film conveying control in the image input device relating to the third embodiment of the present invention.
Figure 18:
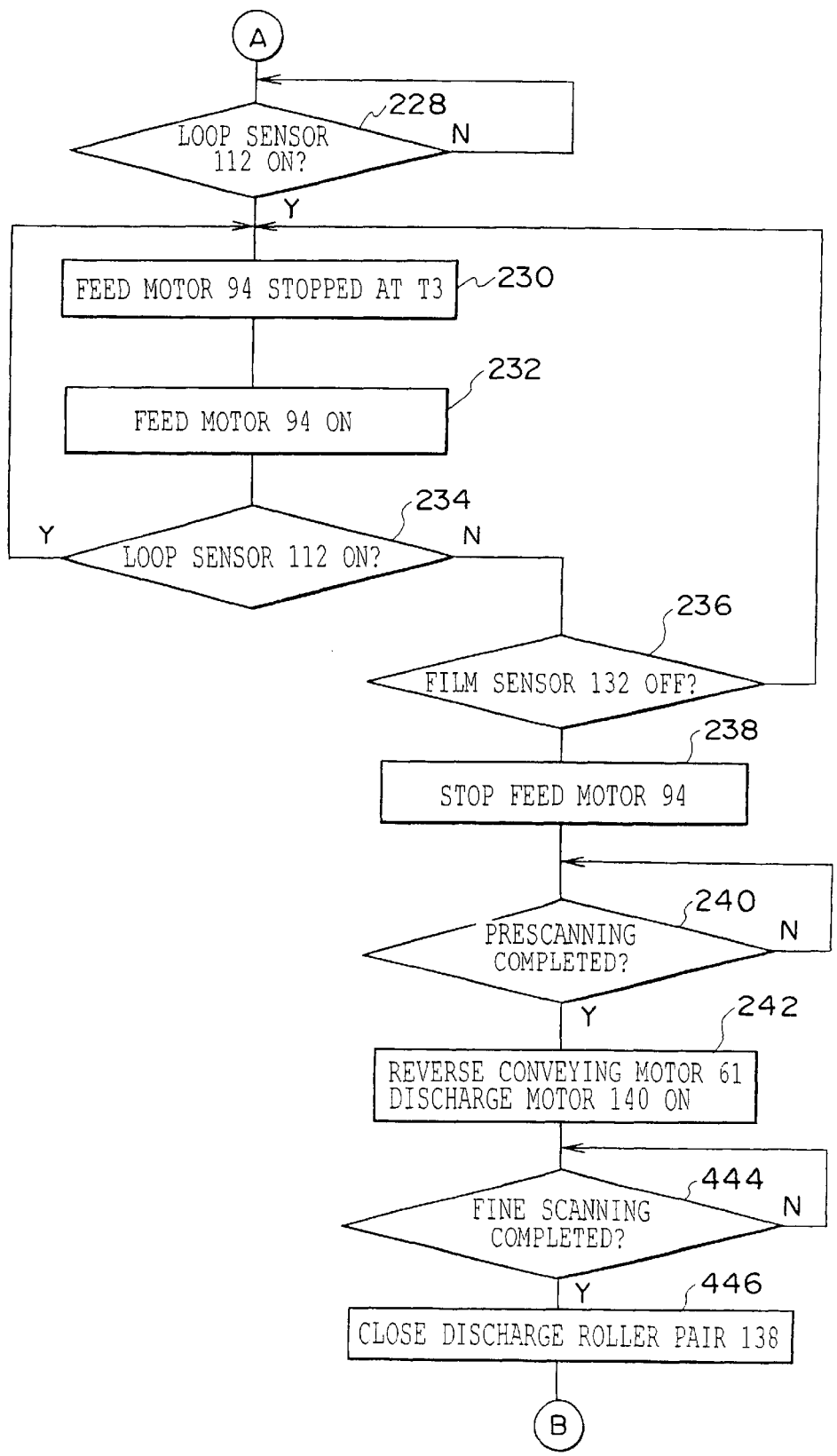
FIG. 18 is a control flowchart showing photographic film conveying control in the image input device relating to the third embodiment of the present invention.

The steps from the start shown in FIG. 17 until step 242 of FIG. 18 are the same as the steps from the start shown in FIG. 9 to step 242 of FIG. 10. Therefore, description thereof is omitted.

At the time of fine scanning, when the trailing end of the photographic film 26 conveyed by the conveying roller pairs 56, 58, 60 is discharged from the reading conveying path 52, the trailing end of the photographic film 26 passes through the connection opening 121 and enters into the conveying merging section 122. This photographic film 26 is guided by the guide lever 128 which is held at the first guide position (see FIG. 12), and enters into the film feed-out path 120. At this time, the nip portion of the driven roller 136 and the driver roller 134 forming the discharge roller pair 138 of the film receiving section 118 is set open by the actuator 142. Accordingly, the photographic film 26 which is discharged from the film feed-out path 120 passes between the driven roller 136 and the driving roller 134, and enters into the film receiving section 118.

When it is judged in step 444 that fine scanning of all of the images of the photographic film 26 has been completed, the routine moves on to step 446 where the nip portion of the discharge roller pair 138 of the film receiving section 118 is closed by the actuator 142. In this way, the photographic film 26 is nipped by the nip portion of the discharge roller pair 138, and is conveyed by the discharge roller pair 138 so as to be discharged into the film receiving section 118 from the film feed-out path 120. Immediately after the nip portion of the discharge roller pair 138 is closed, the leading end of the photographic film 26 separates from the nip portion of the first conveying roller pair 56 of the film carrier 46.

In step 448, a determination is made as to whether the leading end of the photographic film 26 has been detected by the film sensor 150 of the film receiving section 118. When the leading end of the photographic film 26 is detected, the routine moves on to step 450 where, at the time that the predetermined standby time $T_4$ has elapsed from the detection of the leading end of the photographic film 26, the actuator 142 is operated such that the nip portion of the discharge roller pair 138 is opened, and simultaneously therewith, the actuator 148 is operated so that the presser member 146 is returned to the standby position after having been moved from the standby position to the pressing position. Here, the standby time $T_4$ is set to be slightly shorter than the time required for the leading end of the photographic film 26 to be conveyed from the film sensor 150 to the nip portion of the discharge roller pair 138.

When the actuators 142, 148 in the film receiving section 118 are respectively operated at the aforementioned time, the discharge conveying roller pair 138 releases the photographic film 26 from the nip portion substantially simultaneously with the operation of the actuator 142. On the other hand, the presser member 146 contacts the photographic film 26 at an intermediate position between the standby position and the pressing position. Thus, after the actuator 148 is operated, a fixed delay time (0.2 to 0.3 sec in the present embodiment) is required until the presser member 146 contacts the photographic film 26. Thus, movement of the photographic film 26, which is released from the discharge roller pair 138, in the feed-out direction due to inertia and gravity is interrupted until the aforementioned delay time has elapsed. At the point in time when this delay time has elapsed, the leading end of the photographic film 26 moves slightly downstream of the region at which the nip portion of the driving roller 134 and the driven roller 136 is located. The presser member 146 abuts the trailing end portion of the photographic film 26 which has moved to this position, and moves integrally with the photographic film 26 to the pressing position. In this way, a vicinity of the leading end of the photographic film 26 is inserted into the film holder 144, and is held by the film holder 144 At this time, the trailing end side of the photographic film 26 which is hanging down from the film receiving section 118 is inserted into the film feed-out container 156 (see FIG. 1) disposed below the AFL unit 70.

In step 452, on the basis of the detection signal from the film sensor 95 of the film supplying section 71, the presence or absence of the film bundle 72 (the photographic films 26) at the film holder 82 is judged. In a case in which the film bundle 72 is at the film holder 82, the routine returns to step 210, and conveying of the next photographic film 26 from the film holder 82 is started. If there is no film bundle 72 in the film holder 82, it is judged that reading of all of the photographic films 26 set in the film holder 82 has been completed, and the image input device 12 is controlled to be set in a standby state.

In the image input device 12 of the present embodiment, after the trailing end of the one photographic film 26, which has been fed out from the film holder 82 into the film supply path 96, is fed out to the reading conveying path 52, it is possible to supply the next photographic film 26 from the film holder 82 into the film supply path 96. Thus, after reading of a preceding photographic film 26 is completed, the time to convey the second and subsequent photographic films 26 to the reading position R is shortened. Therefore, for the second and subsequent photographic films 26, the trailing end of the photographic film 26, which has been fed out earier from the film holder 82 into the film supply path 96, is fed into the reading conveying path 52, and simultaneously, the next photographic film 26 can be fed out from the film holder 82 into the film supply path 96, and this photographic film 26 can be conveyed until the leading end thereof reaches the second film sensor 132.

In accordance with the above-described image input device 12 of the present embodiment, at the time the photographic film 26 is conveyed by the conveying roller pairs 98, 100 of the film supplying section 71, the photographic film 26 enters into the reading conveying path 52 from the film supply path 96, and the trailing end of the photographic film 26 passes through the conveying merging section 122 at the film supply path 96. Thereafter, the gate lever 128 switches the conveying path of the photographic film 26 such that the photographic film 26 enters into the film feed-out path 120 from the reading conveying path 52. In this way, when the leading end of the photographic film 26 being conveyed along the film supply path 96 reaches the reading conveying path 52, due to the gate lever 128, the photographic film 26 enters into the reading conveying path 52 from the film supply path 96, and is conveyed along the reading conveying path 52 so as to pass through the reading position R. Further, after the trailing end of the photographic film 26 has passed the conveying merging section 122, when the conveying direction of the photographic film 26 is reversed and the trailing end of the photographic film 26 reaches the conveying merging section 122, the photographic film 26 enters into the film feed-out path 120 and is fed-out to the film receiving section 118 along the film feed-out path 120.

At this time, at the image input device 12, at the time the photographic film 26 is conveyed from the conveying merging section 122 toward the reading position R, prescanning of the photographic film 26 is carried out. At the time the photographic film 26 is conveyed from the reading position R toward the conveying merging section 122, fine scanning of the photographic film 26 is carried out. Accordingly, even if the photographic film 26 is elongated, the trailing end side of the photographic film 26 can be fed-out in the film receiving section 118 along the film feed-out path 120 while fine scanning of the photographic film 26 is being carried out. Thus, after fine scanning is completed, immediately after the leading end of the photographic film 26 passes through the conveying merging section 122, the next photographic film 26 can be supplied to the reading conveying path by the film supplying section 71.

As a result, as compared with a conventional device in which, after fine scanning of the photographic film 26 has been completed, the conveying direction of the photographic film 26 is reversed and the photographic film 26 is conveyed to the film receiving section which is disposed at the side opposite the film supplying section, the time until the next photographic film 26 can be supplied to the reading conveying path 52 after fine scanning is completed (i.e., the feed-out wait time) can be shortened. Further, even if the photographic film 26 is elongate, the feed-out wait time does not increase. Thus, the reading time at the time of continuously reading images from a plurality of photographic films 26 by the line CCD scanner 16 can be shortened.

Further, in the image input device 12, the film supplying section 71, in which the photographic films 26 before image reading are set, and the film receiving section 118, which receives the photographic films 26 after image reading, are both disposed in the AFL unit 70. Thus, as compared with a conventional device in which the film supplying section and the film receiving section are disposed at opposite sides of the reading conveying path, the dimension along the transverse direction of the device, which is substantially parallel to the film conveying direction by the reading conveying path 52, can be shortened. Thus, less floor space is required for the image input device 12.

In the image input device 12 of the present embodiment, the gate lever 128 provided at the conveying merging section 122 can swing between a first guide position, at which the guide lever 128 guides the photographic film 26 from the reading conveying path 52 to the film feed-out path 20, and a second guide position, at which the guide lever 128 guides the photographic film 26 from the film supply path 96 to the reading conveying path 52. The gate lever 128 is urged toward the first guide position by an urging member (not shown). In this way, the gate lever 128 is swung from the first guide position to the second guide position due to the pressing force of the photographic film 26 which is conveyed by the conveying roller pairs 98, 100 of the film supplying section 71 and reaches the conveying merging section 122. After the trailing end of the photographic film 26 has passed through the conveying merging section, the gate lever 128 automatically returns from the second guide position to the first guide position due to the urging force of the urging member. Thus, there is no need to provide, at the AFL unit 70, an actuator such as a motor, an electromagnetic solenoid, or the like, for switching the conveying path of the photographic film 26 at the conveying merging section 122. The cost of the AFL unit 70 can be reduced, and the number of parts can be prevented from increasing and the structure can be prevented from becoming complex.

However, the gate lever 128 can swing between a position (the first guide position), at which the film supply path 96 is closed and the entrance to the film feed-out path 120 is open, and a position (the second guide position) at which the film supply path 96 is open and the entry to the film feed-out path 120 is closed, and the gate lever 128 can be moved to either of the first guide position and the second guide position by the driving force from an actuator such as an electromagnetic solenoid, a motor, or the like. In accordance with such a structure, when the photographic film 26 is conveyed to the conveying merging section 122 from the upstream side of the film supply path 96, the gate lever 128 is held at the second guide position by the actuator. Further, when the photographic film 26 is conveyed into the conveying merging section 122 from the reading conveying path 52, the gate lever 128 is held at the first guide position by the actuator. In this way, when the photographic film 26 is conveyed to either the reading conveying path 52 or the film feed-out path 120, the photographic film 26 does not contact the gate lever 128, and therefore, the load applied to the photographic film 26 due to contact with the gate lever 128 can be reduced.

In the image input device 12 of the present embodiment, when the AFL unit 70 is not used, as shown in FIG. 7, the AFL unit 70 is slid backward, and the film supply path 96 and the film feed-out path 120 are disconnected from the reading conveying path 52 of the film carrier 46. In this way, by sliding the AFL unit 70 backward, the photographic film 26 can be directly inserted into the reading conveying path 52 from the film supply path 53 (see FIG. 12). Further, in the state in which the AFL unit 70 is slid backward, after fine scanning has been completed, the photographic film 26 which is discharged from the reading conveying path 52 is accommodated in the film feed-out container 158 fixed to the outer side surface of the image input device 12.

As described above, in accordance with the photographic film conveying device of the present invention, at the time of image reading at which images of a photographic film are read by an image reading means while the photographic film is conveyed by a reading conveying means, the application, from a discharge conveying means to the photographic film, of an external force which can change the conveying speed can be prevented.

Further, as described above, in accordance with the photographic film conveying device of the present invention, even if the length of the film supply path is long, the time, from the time that a preceding Nth photographic film is discharged from a reading conveying path to a time that a subsequent (N+1)st photographic film is conveyed to the reading conveying path, can be prevented from becoming long.

Moreover, as described above, in accordance with the photographic film conveying device of the present invention, even if a photographic film which is set in a film supplying section is elongated, image reading of a plurality of photographic films by an image reading means can be carried out efficiently, and the floor space required to set the device can be reduced.

What is claimed is:

1. A photographic film conveying device which, while conveying a strip-shaped photographic film on which images are recorded, reads the images of the photographic film by an image reading section, the photographic film conveying device comprising:

a film supplying section provided with a loading portion into which is loaded a film bundle in which photographic films are stacked, the film supplying section conveying one photographic film from the film bundle loaded in the loading portion to an image input section at which the image reading section is provided;

a film supply path for guiding to the image input section the photographic film which is conveyed by the film supplying section;

a reading conveying path connected to the film supply path, and guiding the photographic film, which is conveyed to the image input section along the film supply path, to an image reading position at which images are read by the image reading section;

a reading conveying section which conveys the photographic film along the reading conveying path such that an image recorded region of the photographic film passes through the image reading position; and a conveying controlling section which, after starting of conveying by the reading conveying section of an Nth photographic film which is an Nth photographic film whose images are read, synchronously with a trailing end of the Nth photographic film passing through a connection section of the film supply path and the reading conveying path, starts conveying, from the loading portion and by the film supplying section, of an (N+1)st photographic film which is an (N+1)st photographic film whose images are read, and holds the (N+1)st photographic film in the film supply path until the Nth photographic film is discharged.

2. A photographic film conveying device according to claim 1, wherein a leading end detecting sensor is provided on the film supply path, and the leading end detecting sensor detects a leading end of the photographic film conveyed by the film supplying section, and outputs a detection signal, and, synchronously with outputting of the detection signal from the leading end detecting sensor, the conveying controlling section stops conveying of the (N+1)st photographic film by the film supplying section, and when the Nth photographic film is discharged from the reading conveying path, restarts conveying of the (N+1)st photographic film by the film supplying section.

3. A photographic film conveying device according to claim 2, further comprising:

a film receiving section which receives the photographic film after image reading;

a film feed-out path which merges with the film supply path and which guides to the film receiving section the photographic film which has been discharged from the image input section through the reading conveying path; and a conveying switching section which switches a conveying path of the photographic film such that, when the photographic film is conveyed by the film supplying section, the photographic film enters into the reading conveying path from the film supply path, and when a trailing end of the photographic film passes through a merging section with the film feed-out path in the film supply path, the photographic film enters into the film feed-out path from the reading conveying path.

4. A photographic film conveying device according to claim 1, further comprising:

a film receiving section which receives the photographic film after image reading;

a film feed-out path which merges with the film supply path and which guides to the film receiving section the photographic film which has been discharged from the image input section through the reading conveying path; and a conveying switching section which switches a conveying path of the photographic film such that, when the photographic film is conveyed by the film supplying section, the photographic film enters into the reading conveying path from the film supply path, and when a trailing end of the photographic film passes through a merging section with the film feed-out path in the film supply path, the photographic film enters into the film feed-out path from the reading conveying path.

5. A photographic film conveying device which, while conveying a strip-shaped photographic film on which images are recorded, reads the images of the photographic film by an image reading section, the photographic film conveying device comprising:

an auto film loader including a film supplying section in which is loaded a film bundle in which photographic films before image reading are stacked, and which conveys one photographic film from the film bundle into an image input section at which the image reading section is provided, and a film receiving section which receives photographic films after image reading;

a film supply path for guiding to the image input section the photographic film conveyed by the film supplying section;

a reading conveying path which is connected to the film supply path and which guides, to an image reading position at which images are read by the image reading section, the photographic film which is conveyed through the film supply path to the image input section;

a reading conveying section which conveys the photographic film along the reading conveying path such that an image recorded region of the photographic film passes through the image reading position;

a film feed-out path which merges with the film supply path and which guides to the film receiving section the photographic film which is discharged from the image input section through the reading conveying path; and a conveying switching section which switches a conveying path of the photographic film such that, when the photographic film is conveyed by the film supplying section, a leading end of the photographic film enters into the reading conveying path from the film supply path, and when a trailing end of the photographic film passes through a merging section with the film feed-out path in the film supply path, the photographic film enters into the film feed-out path from the reading conveying path.

6. A photographic film conveying device according to claim 5, wherein the conveying switching section has a gate member which can move between a first guide position, at which the gate member guides the photographic film from the reading conveying path to the film feed-out path, and a second guide position, at which the gate member guides the photographic film from the film supply path to the reading conveying path, and the gate member is urged to the first guide position, and the gate member moves from the first guide position to the second guide position due to pushing force from a photographic film which has reached the merging section at the time the photographic film is being conveyed by the film supplying section, and after a trailing end of the photographic film has passed through the merging section, the gate member returns to the first guide position.

7. A photographic film conveying device according to claim 6, further comprising a loop forming section which, at the time when the photographic film is being conveyed by both the film supplying section and the reading conveying section, forms a loop portion, which bends in a direction of thickness of the photographic film, in the photographic film at the film supply path, and the loop forming section can feed a portion of the loop portion out toward the reading conveying path.

8. A photographic film conveying device according to claim 6, wherein a discharge conveying section, which conveys the photographic film, which has entered into the film feed-out path, such that the photographic film is discharged from the film feed-out path, and a film holding section, which can hold ones of end portions of a plurality of photographic films which have been successively discharged from the film feed-out path by a discharge mechanism, are provided in the film receiving section.

9. A photographic film conveying device according to claim 5, further comprising a loop forming section which, at the time when the photographic film is being conveyed by both the film supplying section and the reading conveying section, forms a loop portion, which bends in a direction of thickness of the photographic film, in the photographic film at the film supply path, and the loop forming section can feed a portion of the loop portion out toward the reading conveying path.

10. A photographic film conveying device according to claim 9, wherein a discharge conveying section, which conveys the photographic film, which has entered into the film feed-out path, such that the photographic film is discharged from the film feed-out path, and a film holding section, which can hold ones of end portions of a plurality of photographic films which have been successively discharged from the film feed-out path by a discharge mechanism, are provided in the film receiving section.

11. A photographic film conveying device according to claim 5, wherein a discharge conveying section, which conveys the photographic film, which has entered into the film feed-out path, such that the photographic film is discharged from the film feed-out path, and a film holding section, which can hold ones of end portions of a plurality of photographic films which have been successively discharged from the film feed-out path by a discharge mechanism, are provided in the film receiving section.

* * * * *